United States Patent
Tanaka

(10) Patent No.: US 10,476,338 B2
(45) Date of Patent: Nov. 12, 2019

(54) STATOR FOR ELECTRIC ROTARY MACHINE

(71) Applicant: HONDA MOTOR CO., LTD., Tokyo (JP)

(72) Inventor: Hiroki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 15/606,406

(22) Filed: May 26, 2017

(65) Prior Publication Data

US 2017/0346369 A1    Nov. 30, 2017

(30) Foreign Application Priority Data

May 30, 2016  (JP) ................................. 2016-106927

(51) Int. Cl.
  *H02K 3/12*  (2006.01)
  *H02K 3/28*  (2006.01)
  *H02K 3/24*  (2006.01)

(52) U.S. Cl.
  CPC ................. *H02K 3/28* (2013.01); *H02K 3/12* (2013.01); *H02K 3/24* (2013.01)

(58) Field of Classification Search
  CPC ............... H02K 3/12; H02K 3/24; H02K 3/28
  See application file for complete search history.

(56) References Cited

U.S. PATENT DOCUMENTS

| 5,998,903 A * | 12/1999 | Umeda | ................... | H02K 1/243 310/179 |
| 2001/0040415 A1* | 11/2001 | Asao | ........................ | H02K 3/38 310/201 |

(Continued)

FOREIGN PATENT DOCUMENTS

CN    104953729 A    9/2015
JP    2010-233318 A    10/2010

(Continued)

OTHER PUBLICATIONS

Jan. 11, 2019, Chinese Office Action issued for related CN Application No. 201710381688.6.

(Continued)

*Primary Examiner* — Mohamad A Musleh
(74) *Attorney, Agent, or Firm* — Paratus Law Group, PLLC

(57) ABSTRACT

A stator for an electric rotary machine includes: a stator core which has plural slots; and segmented coils of a plurality of phases, wherein: the stator core is provided with a base plate at least one side thereof in an axial direction; the segmented coils of the plurality of phases include plural slot coils which are individually disposed in the plural slots of the stator core and which extend substantially linearly, and plural connection coils which are individually disposed in the base plate and which make up bridge portions by connecting the slot coils of a same phase together; the connection coil is accommodated in a connection coil accommodating groove formed on a front surface of the base plate; and the base plate is provided with a communication portion on an outer circumferential surface thereof for communicating with the connection coil accommodating groove.

4 Claims, 18 Drawing Sheets

(56) References Cited

U.S. PATENT DOCUMENTS

| | | | | |
|---|---|---|---|---|
| 2004/0046475 A1* | 3/2004 | Holzheu | ............... | H02K 3/12 |
| | | | | 310/201 |
| 2008/0174199 A1* | 7/2008 | Ishigami | ............... | H02K 3/12 |
| | | | | 310/199 |
| 2010/0244594 A1 | 9/2010 | Murakami et al. | | |
| 2013/0020890 A1* | 1/2013 | Iki | ............... | H02K 3/12 |
| | | | | 310/71 |
| 2013/0020891 A1* | 1/2013 | Kishi | ............... | H02K 3/12 |
| | | | | 310/71 |
| 2013/0020901 A1* | 1/2013 | Kishi | ............... | H02K 3/12 |
| | | | | 310/215 |
| 2015/0280503 A1 | 10/2015 | Takahashi et al. | | |
| 2017/0025907 A1* | 1/2017 | Iki | ............... | H02K 3/12 |
| 2017/0025913 A1* | 1/2017 | Nagahiro | ............... | H02K 3/12 |
| 2017/0141635 A1* | 5/2017 | Iki | ............... | H02K 3/28 |

FOREIGN PATENT DOCUMENTS

| | | |
|---|---|---|
| JP | 2011-097780 A | 5/2011 |
| JP | 2011-182581 A | 9/2011 |
| JP | 2013-027174 A | 4/2013 |
| JP | 2015-233362 A | 12/2015 |

OTHER PUBLICATIONS

Mar. 20, 2018, Japanese Office Action issued for related JP application No. 2016-106927.

\* cited by examiner

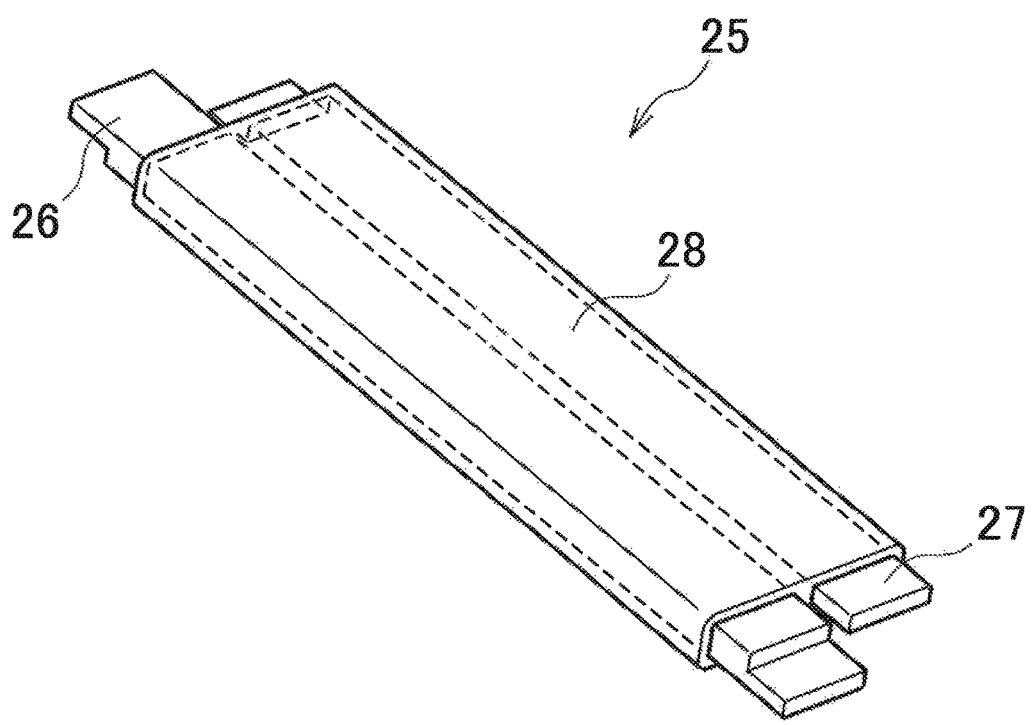

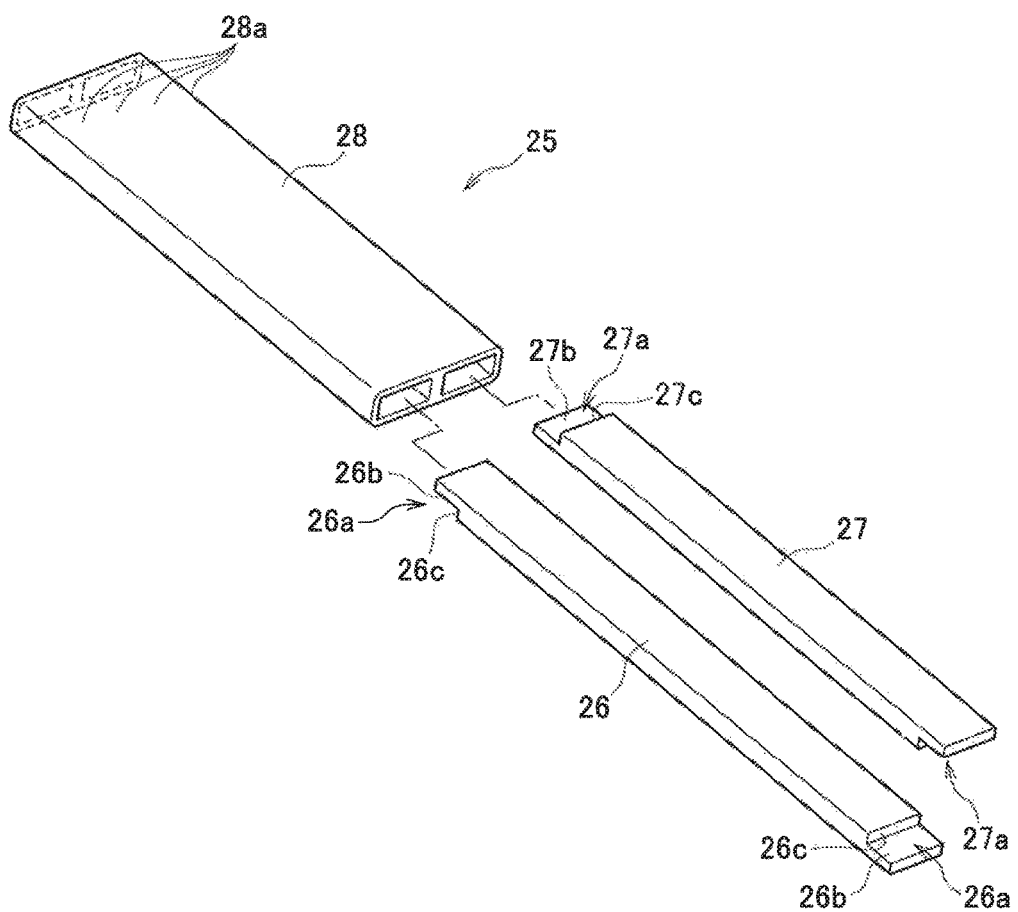

STATOR FOR ELECTRIC ROTARY MACHINE

CROSS-REFERENCE TO RELATED APPLICATION(S)

This application claims priority from Japanese Patent Application No. 2016-106927 filed on May 30, 2016, the entire contents of which are incorporated herein by reference.

TECHNICAL FIELD

The present invention relates to a stator for an electric rotary machine that can be mounted on an electric vehicle, a hybrid vehicle and the like.

BACKGROUND ART

As a stator for an electric rotary machine, an electric rotary machine using segmented coils has been proposed. For example, a stator for an electric rotary machine is proposed in Patent Literature 1 in which slot coils disposed in slots of a stator core and connection coils disposed on outer side of the stator core and making up bridge portions are coupled by caulking to form coil loops.

Meanwhile, in recent years, an electric rotary machine has been increasing in power. Since the performance of the electric rotary machine is deteriorated due to the temperature rise of the stator coil, a method of cooling the stator coil or the like is considered as a countermeasure. For example, a method of cooling the stator coil by supplying refrigerant from the above of the coil end toward the coil end is proposed.

PRIOR ART LITERATURE

Patent Literature

Patent Literature 1: JP-A-2013-027174

SUMMARY OF THE INVENTION

Problem that the Invention is to Solve

However, in the case of cooling the stator coil by supplying the refrigerant from above, the refrigerant cannot reach the coil located below in the vertical direction, thereby causing a local temperature rise of the coil in some cases.

An object of the invention is to provide a stator for an electric rotary machine that is capable of efficiently supplying refrigerant to the coil located below.

Means for Solving the Problem

The invention provides the following aspects.
1. A stator (e.g., a stator 10) for an electric rotary machine including:
a stator core (e.g., a stator core 21), which has plural slots (e.g., slots 23); and segmented coils (e.g., coils 50) of a plurality of phases, wherein:
the stator core is provided with a base plate (e.g., a base plate 31L, 31R) at least one side thereof in an axial direction;
the segmented coils of the plurality of phases include plural slot coils (e.g., slot coils 25) which are individually disposed in the plural s of the stator core and which extend substantially linearly, and plural connection coils (e.g., connection coils 40) which are individually disposed in the base plate and which make up bridge portions by connecting the slot coils of a same phase together;
the connection coil is accommodated in a connection coil accommodating groove (e.g., an outer surface groove 37 and an inner surface groove 38) formed on a front surface of the base plate; and
the base plate is provided with a communication portion (e.g., a communication portion 135) on an outer circumferential surface thereof for communicating with the connection coil accommodating groove.
2. The stator for an electric rotary machine according to aspect 1, wherein:
the connection coil includes an inner connection coil (e.g., an inner connection coil 42) and an outer connection coil (e.g., an outer connection coil 41) which are disposed in different positions in the axial direction;
the base plate is formed with the connection coil accommodating grooves on an outer surface (e.g., an outer surface 35) and an inner surface (e.g., an inner surface 36) thereof, respectively;
the outer connection coil is disposed in an outer surface groove (e.g., an outer surface groove 37) formed on the outer surface;
the inner connection coil is disposed in an inner surface groove (e.g., an inner surface groove 38) formed on the inner surface; and
the communication portion includes an outer surface communicating portion (e.g., an outer surface communicating portion 136) and an inner surface communicating portion (e.g., an inner surface communicating portion 137), the outer surface communicating portion communicating with the outer surface groove and the inner surface communicating portion communicating with the inner surface groove.
3. The stator for an electric rotary machine according to aspect 1 or 2, wherein:
the base plate is provided in pairs on both ends of the stator core in the axial direction; and
the pair of base plates are provided with the communication portions, respectively.
4. The stator for an electric rotary machine according to any one of aspects 1 to 3, wherein
the base plate is provided with a guide portion (e.g., guide portion 138) on the outer circumferential surface thereof integrally with the base plate or separately from the base plate to guide refrigerant to the communication portion.
5. The stator for an electric rotary machine according to any one of aspects 1 to 4, wherein
the communication portion is provided in a vicinity of a horizontal line passing through an axial center (e.g., axial center O) of the electric rotary machine or above the horizontal line.

Advantage of the Invention

According to aspect 1, since the communication portion for communicating with the connection coil accommodating groove is provided on the outer circumferential surface of the base plate, the refrigerant supplied to the outer circumferential surface is supplied to the connection coil accommodating groove, in which the connection coil is accommodated, through the communication portion. In addition, since the refrigerant supplied to the connection coil accommodating groove is guided downward passing through the front surface side of the base plate, the refrigerant can reach the connection coil located below. Thus, it is possible to suppress the local temperature rise of the coil and suppress the performance deterioration of the electric rotary machine due to the temperature rise.

According to aspect 2, since the base plate is formed with an outer surface groove for accommodating the outer connection coil and an inner surface groove for accommodating the inner connection coil, and the communication portion includes the outer surface communicating portion which communicates with the outer surface groove and the inner surface communicating portion which communicates with the inner surface groove, the refrigerant can be supplied to both sides of the base plate from the outer circumferential surface, that is, the outer surface side and the inner surface side, and thus the connection coils on both surfaces of the base plate can be cooled uniformly. Particularly, the inner connection coil on the inner surface side facing the stator core is hardly cooled, but the inner connection coil can be efficiently cooled by supplying the refrigerant to the inner surface groove through the inner surface communicating portion.

According to aspect 3, the pair of base plates located on both the ends of the stator core are provided with the communication portions respectively, and thus the connection coils on the both sides of the stator core can be cooled uniformly.

According to aspect 4, since the guide portion which guides the refrigerant to the communication portion is provided on the outer circumferential surface of the base plate integrally with the base plate or separately from the base plate, the refrigerant can be efficiently guided to the communication portion by the guide portion.

According to aspect 5, the communication portion is provided in the vicinity of the horizontal line passing through the axial center of the electric rotary machine or above the horizontal line, and thus the refrigerant can be guided to the front surface side of the base plate from the outer circumferential surface of the base plate using gravity. In addition, the refrigerant can be retained in the connection coil accommodating groove at a region below the horizontal line, that is, a region where the communication portion is not provided. At the region below the horizontal line where the communication portion is provided, the refrigerant supplied to the connection coil accommodating groove can be positively discharged.

BRIEF DESCRIPTION OF DRAWINGS

FIG. 5A is a perspective view of a slot coil.

FIG. 5B is an exploded perspective view of the slot coil.

MODE FOR CARRYING OUT THE INVENTION

Figure 1:
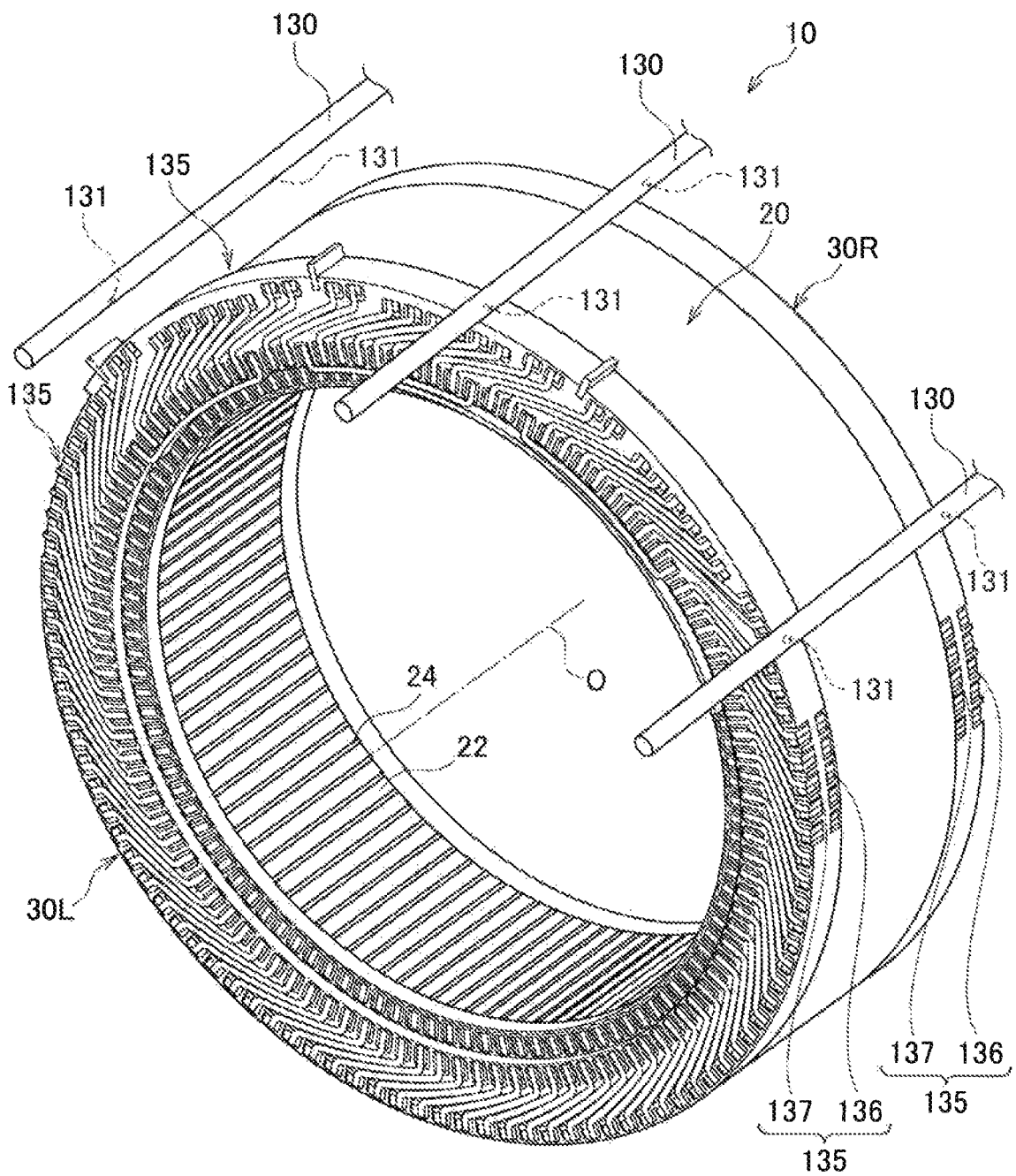
FIG. 1 is a perspective view of a stator for an electric rotary machine according to the invention.

Hereinafter, an embodiment of a stator for an electric rotary machine of the invention will be described based on the accompanying drawings. The drawings should be seen in a direction in which reference numerals given therein look proper.

[Stator]

Figure 2:
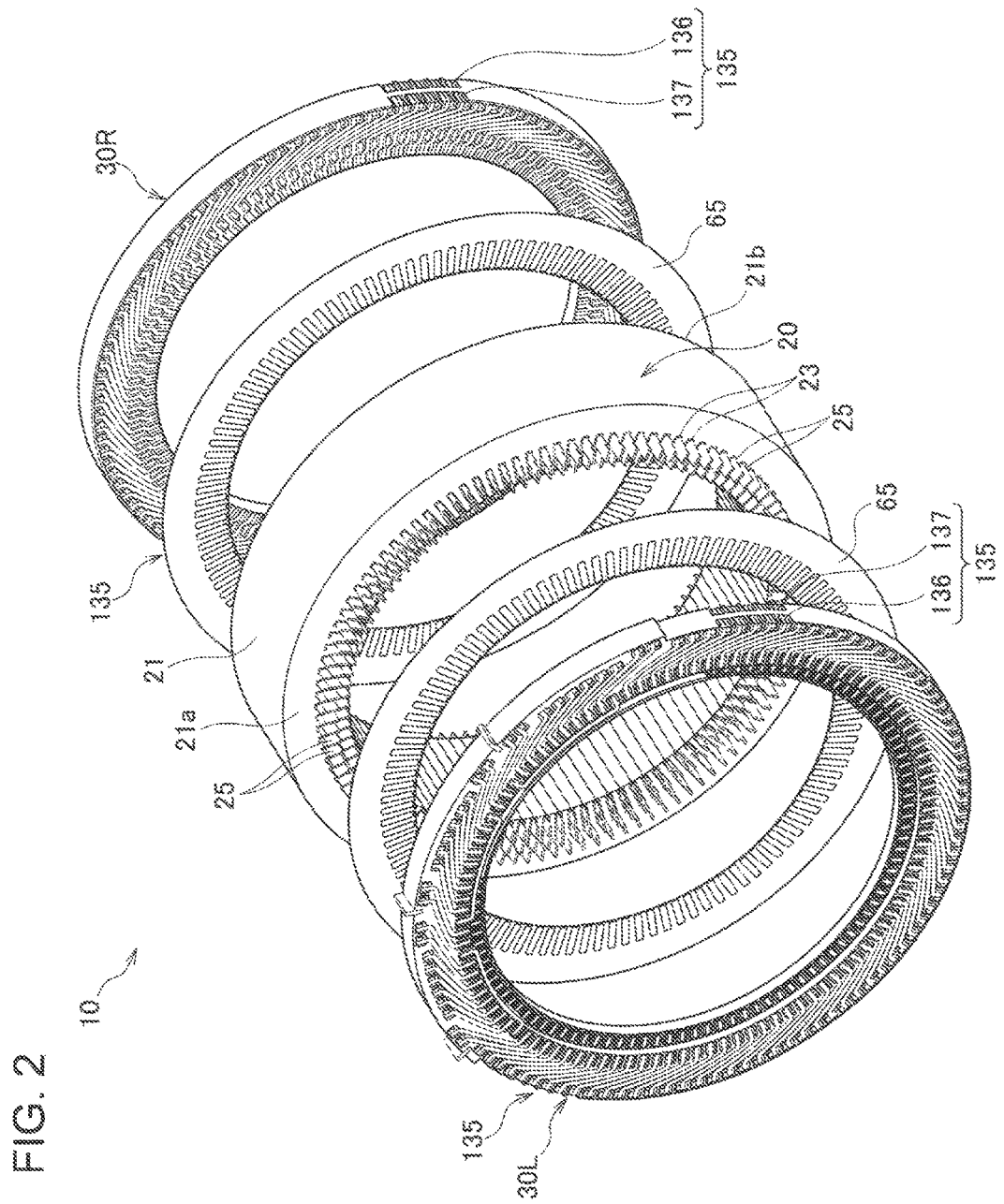
FIG. 2 is an exploded perspective view of the stator shown in FIG. 1.

As shown in FIGS. 1 and 2, a stator 10 for an electric rotary machine of this embodiment includes a stator core assembly 20 and a pair of base plate assemblies 30l, 30R, and the base plate assemblies 30L, 30R are disposed at both ends of the stator core assembly 20. An insulation sheet 65 of, for example, a silicone sheet is disposed between the stator core assembly 20 and each of the base plate assemblies 30L, 30R to insulate the stator core assembly 20 from the base plate assemblies 30L, 30R.

[Stator Core Assembly]

The stator core assembly 20 includes a stator core 21 and plural (108 in the illustrated embodiment) slot coils 25.

[1-1 Stator Core]

The stator core 21 is made up, for example, of plural pressed and punched sheets of silicon steel that are laminated together and includes plural (108 in the illustrated embodiment) teeth 22 and plural (108 in the illustrated embodiment) slots 23 that are defined between the adjacent teeth 22 on a radially inner side thereof. The slots 23 are formed so as to penetrate the stator core 21 in an axial direction thereof are each formed into a substantially elliptic shape that is long in a radial direction of the stator core 21 as seen in the axial direction and each has an opening portion 24 that opens to an inner circumferential surface of the stator core 21.

[1-2 Slot Coil]

Figure 6:
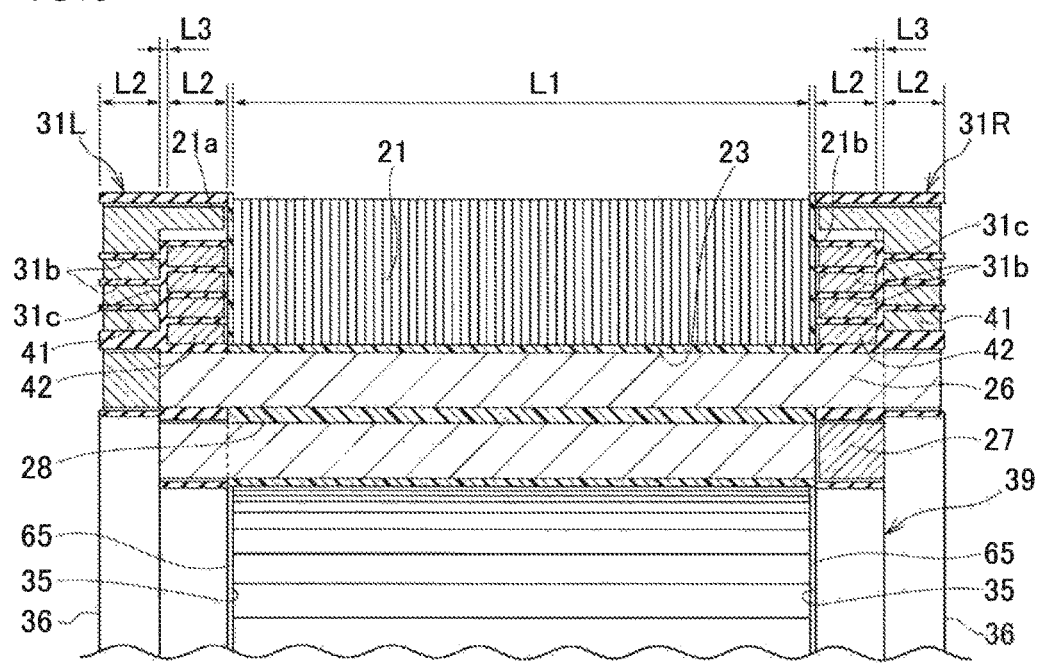
FIG. 6 is a vertical sectional view showing part of the stator shown in FIG. 1.

Referring also to FIGS. 5A, 5B and 6, the slot coil 25 inserted into each slot 23 has a radially outer slot coil 26 and a radially inner slot coil 27 which are both a plate conductor having a rectangular section, and the radially outer slot coil 26 and the radially inner slot coil 27 are surrounded therearound excluding axial end portions thereof by an insulation material 28 having a rectangular section which is an injection molded resin, whereby the radially outer slot coil 26 and the radially inner slot coil 27 are formed into an integral unit. Specifically speaking, the radially outer slot coil 26 is set at a length (L1+4×L2) that is substantially equal to a sum of an axial width L1 of the stator core 21 and a total axial width (4×L2) of four connection coils 40, which will be described later, and axial end portions are exposed individually from the insulation material 28 by a length (2×L2) substantially equaling a total axial width of two connection coils 40. Further, at one axial end portion of the radially outer slot coil 26, a surface oriented in one circumferential direction is cut out by a length (L2) equalling the axial width of one connection coil 40 in a step-like fashion so as to reduce a thickness of the one axial end portion, whereby a step portion 26a is formed on the one axial end portion, while at the other axial end portion of the radially outer slot coil 26, a surface oriented in the other circumferential direction is cut out by the length (L2) equalling the axial width of one connection coil 40 in a step-like fashion so as to reduce a thickness of the other axial end portion, whereby a step portion 26a is formed on the other axial end portion.

The radially inner slot coil 27 is set at a length (L1+2×L2) that is substantially equal to a sum of the axial width (L1) of the stator core 21 and a total axial width (2×L2) of two connection coils 40, which will be described later, and axial end portions are exposed individually from the insulation material 28 by the length (L2) substantially equaling an axial width of one connection coil 40. Further, at one axial end portion of the radially inner slot coil 27, a surface oriented in the other circumferential direction is cut out by a length (L2) equalling the axial width of one connection coil 40 in a step-like fashion so as to reduce a thickness of the one axial end portion, whereby a step portion 27a is formed on the one axial end portion, while at the other axial end portion of the radially inner slot coil 27, a surface oriented in the one circumferential direction is cut out by the length (L2) equalling the axial width of one connection coil 40 in a step-like fashion so as to reduce a thickness of the other axial end portion, whereby a step portion 27a is formed on the other axial end portion.

In other words, in the slot coil 25, the radially outer slot coil 26 is exposed from the insulation material 28 at the axial ends thereof by the length (2×L2) substantially equalling the total axial width of two connection coils 40, and the radially inner slot coil 27 is exposed from the insulation material 28 at the axial ends thereof by the length (L2) equalling the axial width of one connection coil 40. The step portions 26a, 27a are formed at the distal end portions of the radially outer slot coil 26 and the radially inner slot coil 27 by the length (L2) equalling the axial width of one connection coil 40 so as to be oriented in the opposite circumferential directions. In addition, the step portions 26a of the radially outer slot coil 26 and the step portions 27a of the radially inner slot coil 27 are formed so as to be oriented in the opposite circumferential directions at the one axial end portion and the other axial end portion.

The plural (108 in the illustrated embodiment) slot coils 25 each made up of the radially outer slot coil 26 and the radially inner slot coil 27 are disposed along the radial directions of the stator core 21 so that the radially outer slot coils 26 are situated on a radially outer side and the radially inner slot coils 27 are situated on a radially inner side in the slots 23. The slot coils 25 are inserted individually into the plural slots 23 formed in the stator core 21 and are aligned in the circumferential direction of the stator core 21, thereby making up the stator core assembly 20.

The radially outer slot coil 26 is inserted into the slot 23 so that the distal end portions project individually from both end faces 21a, 21b of the stator core 21 by the length (2×L2) that is substantially equal to the total axial width of substantially two connection coils 40, and the radially inner slot coil 27 is inserted into the slot 23 so that the distal end portions project individually from both the end faces 21a, 21b of the stator core 21 by the length (L2) that is equal to the axial width of substantially one connection coil 40.

The insulation material 28 that covers the radially outer slot coil 26 and the radially inner slot coil 27 is interposed between both the slot coils 26, 27 and the slot 23 in the stator core 21 so as to ensure the insulation between the radially outer and inner slot coils 26, 27 and the stator core 21.

The insulation material 28 that covers the radially outer slot coil 26 and the radially inner slot coil 27 has substantially the same shape as that of the slot 23 but is slightly greater than the slot 23, and the insulation material 28 can easily be fixed into the slot 23 through press fitting. In addition, as the insulation material 28, an epoxy resin, an enamel resin, and the like can be used.

[2 Base Plate Assembly]

Figure 3:
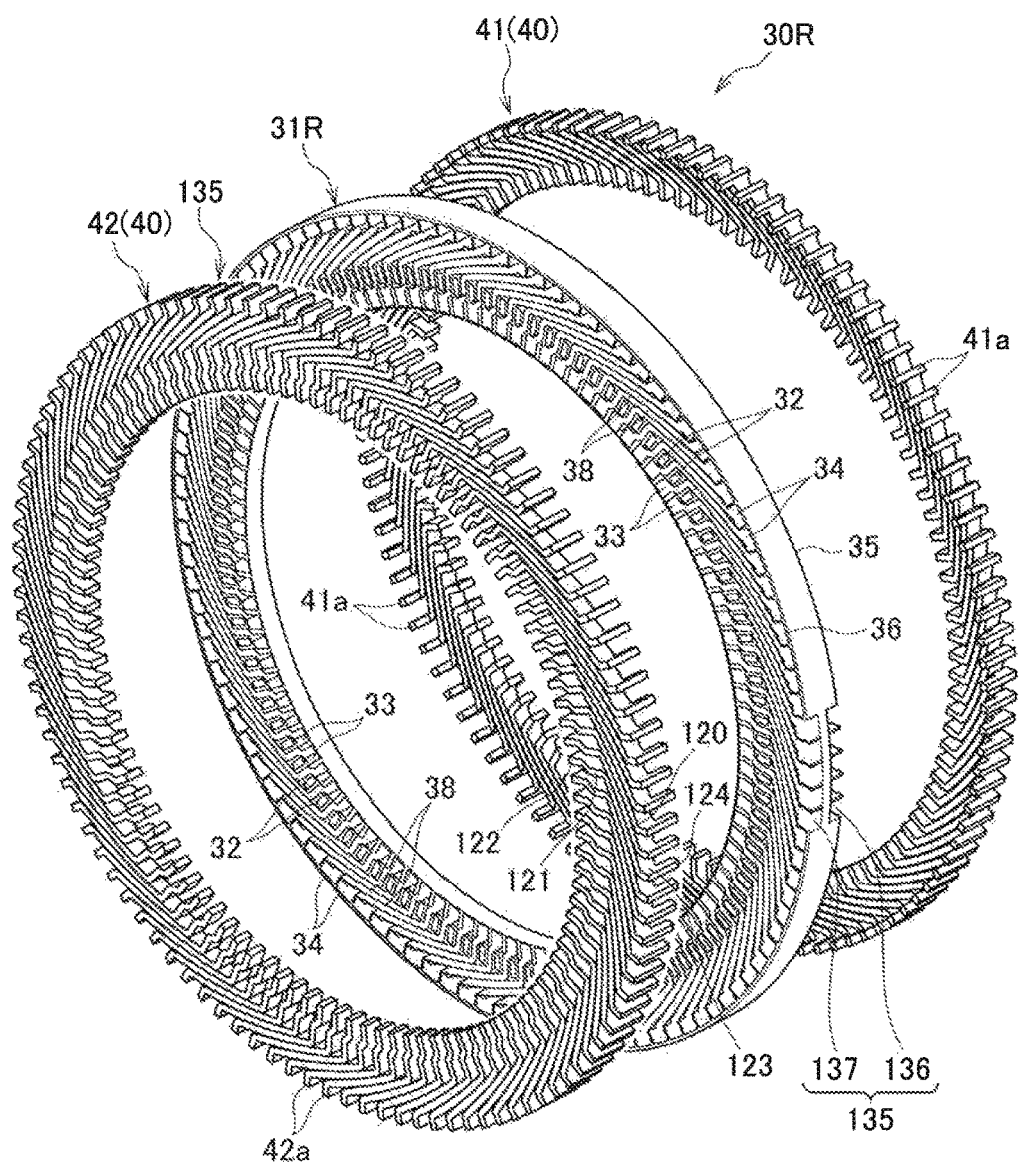
FIG. 3 is an exploded perspective view of one of base plate assemblies shown in FIG. 2.
Figure 4:
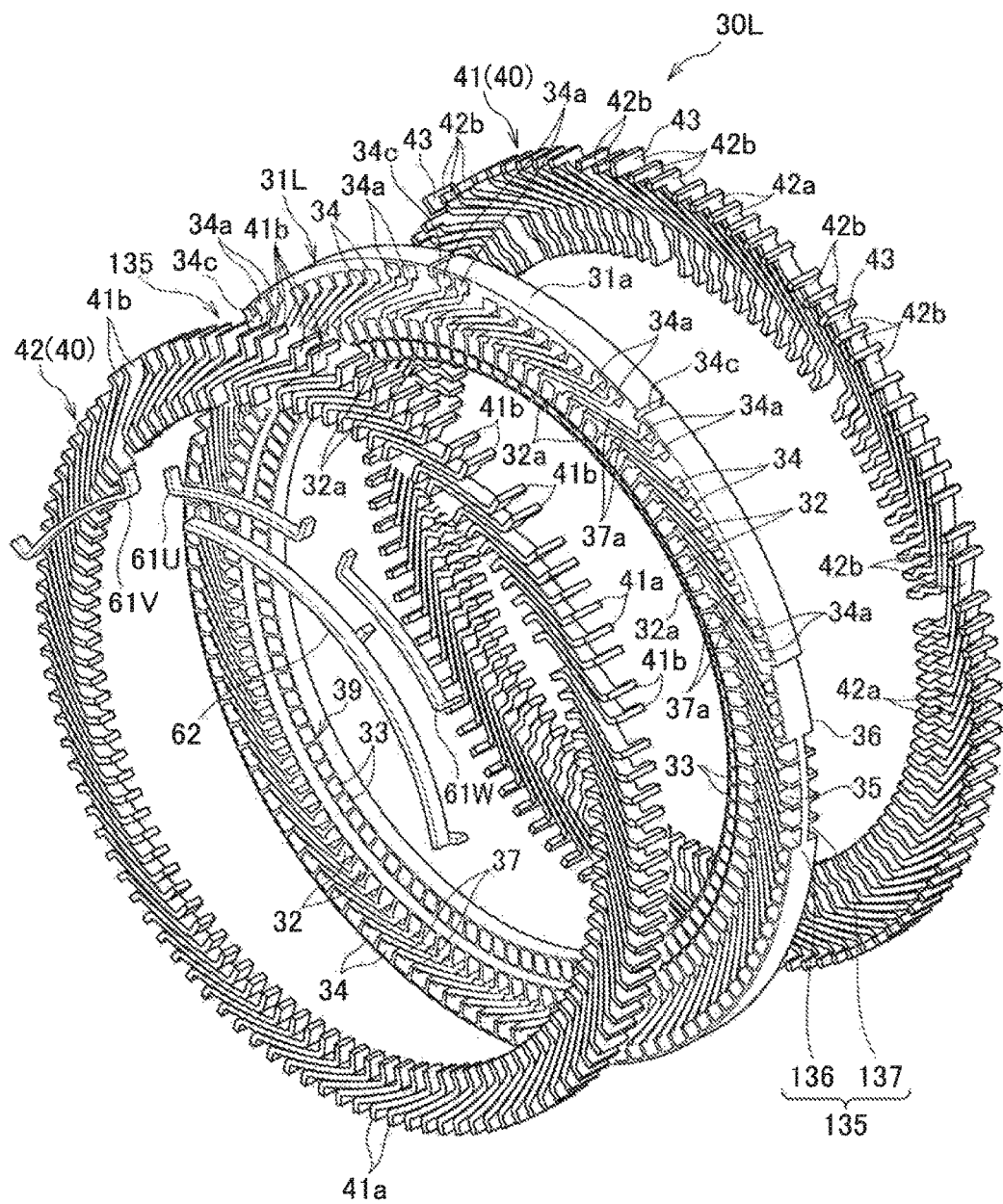
FIG. 4 is an exploded perspective view of the other of the base plate assemblies shown in FIG. 2.

The base plate assemblies 30L, 30R that are disposed individually at the ends of the stator core assembly 20 include base plates 31L, 31R and plural connection coils 40, as shown in FIGS. 3 and 4.

[2-1 Base Plates]

The base plates 31L, 31R are substantially annular members that are formed from a resin having insulation properties (a non-magnetic material) and which have a bore diameter and an outside diameter that are substantially the same as those of the stator core 21.

As shown in FIG. 3, a plurality (108 in the illustrated embodiment) of radially outer through holes 32 and a plurality (108 in the illustrated embodiment) of radially inner through holes 33 are formed at equal intervals in a radially inner side of the base plate 31R so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31R to establish a communication between an outer surface 35 and an inner surface 36 of the base plate 31R. By assembling the base plate assembly 30R to the stator core assembly 20, the distal end portions of the radially outer slot coils 26 that are inserted into the slots 23 in the stator core 21 and which project from the end faces 21a, 21b of the stator core 21 are disposed in the radially outer through holes 32 of the base plate 31R and the distal end portions of the radially inner slot coils 27 that are inserted into the slots 23 in the stator core 21 and which project from the end faces 21a, 21b of the stator core 21 are disposed in the radially inner through holes 33 of the base plate 31R. In the radially outer through holes 32, opening portions that open to the inner surface 36 are smaller than opening portions that open to the outer surface 35, and are caused to penetrate the base plate 31R at only portions where the distal end portions of the radially outer slot coils 26 pass through.

Figure 7A:
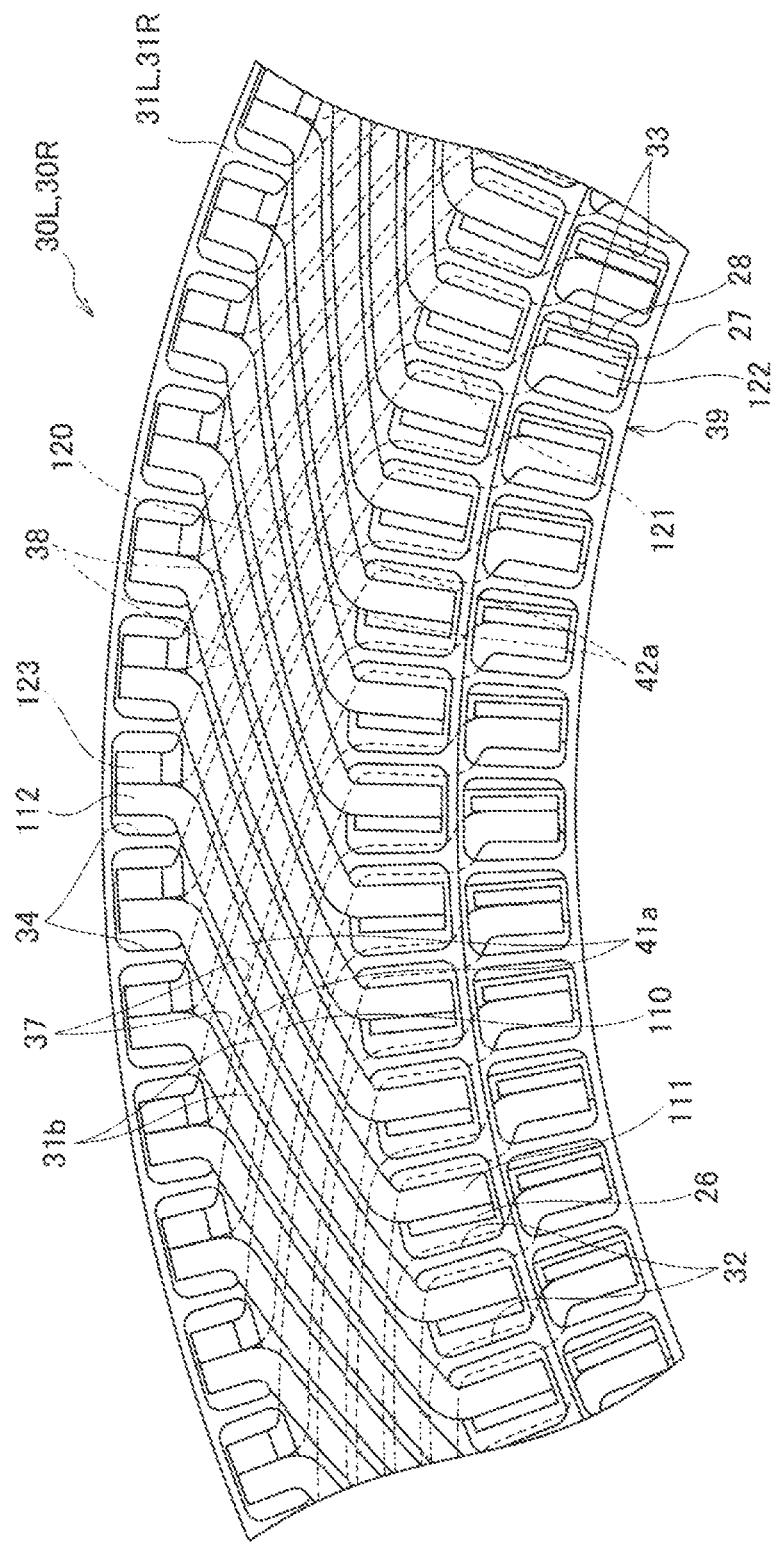
FIG. 7A is a front view showing part of the base plate assemblies shown in FIGS. 3 and 4.

Further, a plurality (108 in this illustrated embodiment) of outer circumferential holes 34 are formed at equal intervals in a radially outer side of the base plate 31R so as to penetrate the base plate 31R, whereby a communication is established between the outer surface 35 and the inner surface 36. As shown in FIG. 7A, a plurality (108 in this illustrated embodiment) of outer surface grooves 37 and a plurality (108 in this illustrated embodiment) of inner surface grooves 38 are formed on the outer surface 35 and the inner surface 36 of the base plate 31R, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively.

The base plate 31L basically has a similar construction to that of the base plate 31R. A plurality (108 in the illustrated embodiment) of radially outer through holes 32 and a plurality (108 in the illustrated embodiment) of radially inner through holes 33 are also formed at equal intervals in a radially inner side of the base plate 31L so as to correspond to the radially outer slot coils 26 and the radially inner slot coils 27, respectively, of the slot coils 25 that are inserted into the slots 23 in the stator core 21. The radially outer through holes 32 and the radially inner through holes 33 penetrate the base plate 31L so as to establish a communication between the outer surface 35 and the inner surface 36 of the base plate 31L.

On the other hand, a deployed portion 31a that extends into a fan shape radially outwards in an upper portion in the figure is provided on a radially outer side of the base plate 31L, and plural outer circumferential holes 34 are formed at equal intervals in other portions than the deployed portion 31a so as to penetrate the base plate 31L to thereby establish a communication between the outer surface 35 and the inner surface 36. In the deployed portion 31a, two sets of two outer circumferential holes 34a, each having an opening area that is slightly greater than that of the other outer circumferential holes 34, are formed for each of U, V and W phases in such a way as to hold six outer circumferential holes 34 therebetween, and input terminal notched portions 34c are formed at equal intervals one for each phase. Input terminal portions 43 of three inner connection coils 42b with which the input terminal portions 43 are formed integrally are disposed individually in the input terminal notched portions 34c, The inner connection coils 42b will be described later.

On a radially inner side of the deployed portion 31a of the base plate 31L, a set of two radially outer through holes 32a, each having a busbar notched portion (not shown) formed on an inner circumferential side thereof, are formed for each phase in such a way as to hold eight radially outer through holes 32 therebetween. Further, radially inner through hole 33a having a middle point busbar notched portion (not shown) formed on an inner circumferential side thereof are formed for each phase in such a way as to hold eleven radially inner through holes 33 therebetween. Busbar connecting portions of busbars 61U, 61V, 61W that connect coils of the same phase together are disposed in the busbar notched portions, and middle point busbar connecting portions of middle point busbars 62 that connect coils of U, V, W phases together are disposed in the middle point busbar notched portions.

Radially outer end portions 112 of outer connection coils 41 and radially outer end portions 123 of inner connection coils 42, which wall be described later, are disposed in the outer circumferential holes 34, 34a of the base plates 31L, 31R. The radially outer through holes 32, 32a, the radially inner through holes 33, 33a and the outer circumferential holes 34, 34a exhibit a rectangular shape as seen from the axial direction and have a space greater than the coil member that is disposed in an interior thereof.

In addition, a plurality (102 in the outer surface 35 in this illustrated embodiment) of outer surface grooves 37 and a plurality (102 in the inner surface 36 in this illustrated embodiment) of inner surface grooves 38 are formed also on the outer surface 35 and the inner surface 36 of the base plate 31L, respectively, so as to extend in circumferential directions along involute curves in such a way as to lie close to one another. The outer surface grooves 37 and the inner surface grooves 38 have a substantially U-shaped cross section and open to the outer surface 35 and the inner surface 36, respectively. In the deployed portion 31a of the base plate 31L, a total of twelve, four for each phase, outer surface grooves 37a that are formed slightly longer than the other outer surface grooves 37 are formed on the outer surface 35, and a total of fifteen, five for each phase, inner surface grooves 38a that are formed slightly longer than the other inner surface grooves 38 are formed on the inner surface 36. The number of outer surface grooves 37, 37a is smaller by six, two for each phase, than the number of outer surface grooves 37 that are formed on the base plate 31R, and the number of inner surface grooves 38, 38a is smaller by three, one for each phase, than the number of inner surface grooves 38 that are formed on the base plate 31R. Instead, the coils of the same phases are connected together by the busbars 61U, 61V, 61W and the coils of different phases are connected together by the middle point busbars 62. In these base plates 31L, 31R, as shown in FIG. 6, the outer surface grooves 37, 37a that lie adjacent to one another and the inner surface grooves 38, 38a that lie adjacent to one another are isolated by walls 31b that rise from the base plate 31L, and the outer surface grooves 37, 37a and the inner surface grooves 38, 38a that face each other in the axial direction are isolated by partition walls 31c, whereby the individual grooves are electrically insulated from one another.

Figure 7B:
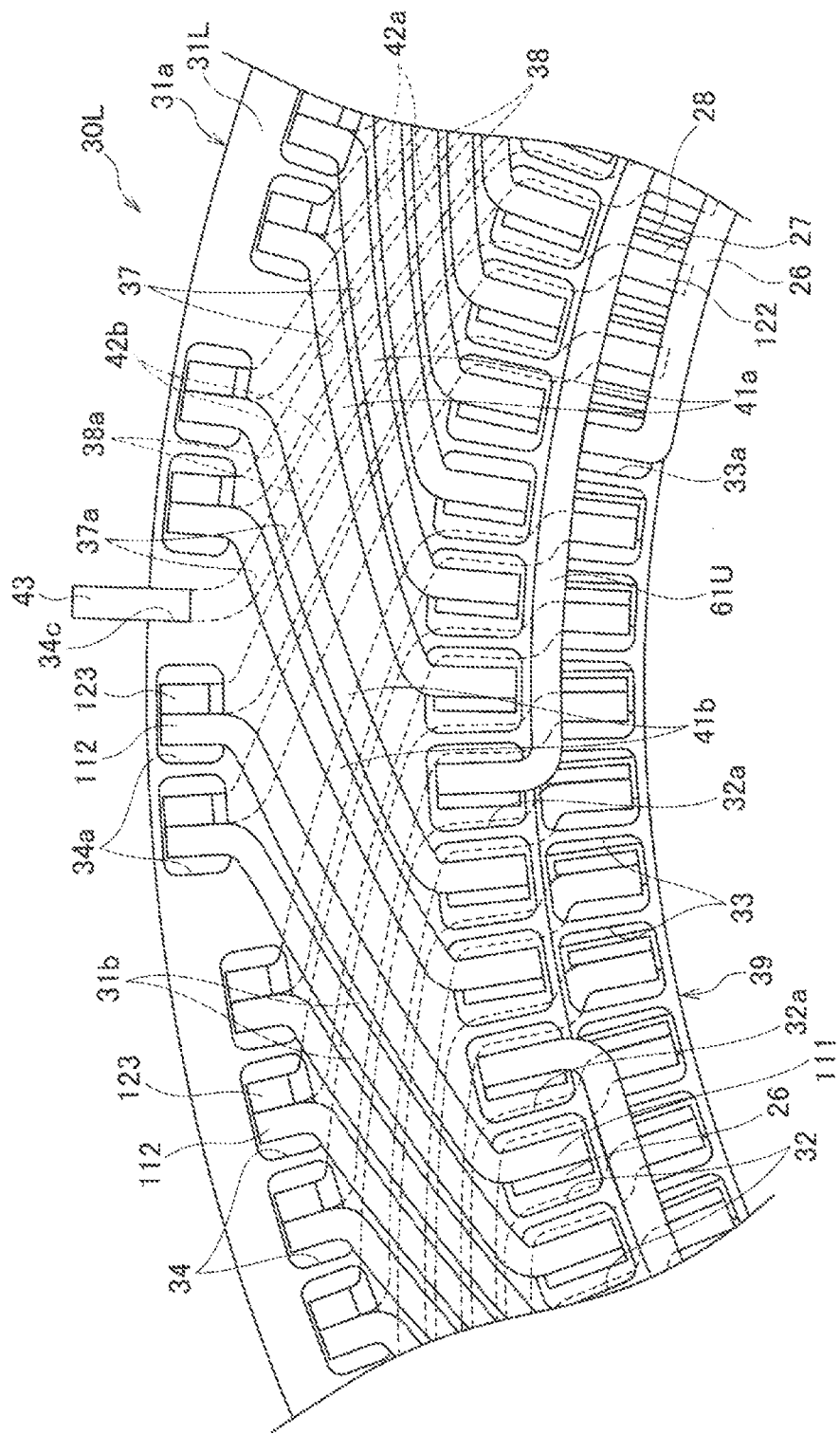
FIG. 7B is a front view showing part of the base plate assembly shown in FIG. 4.
Figure 15:
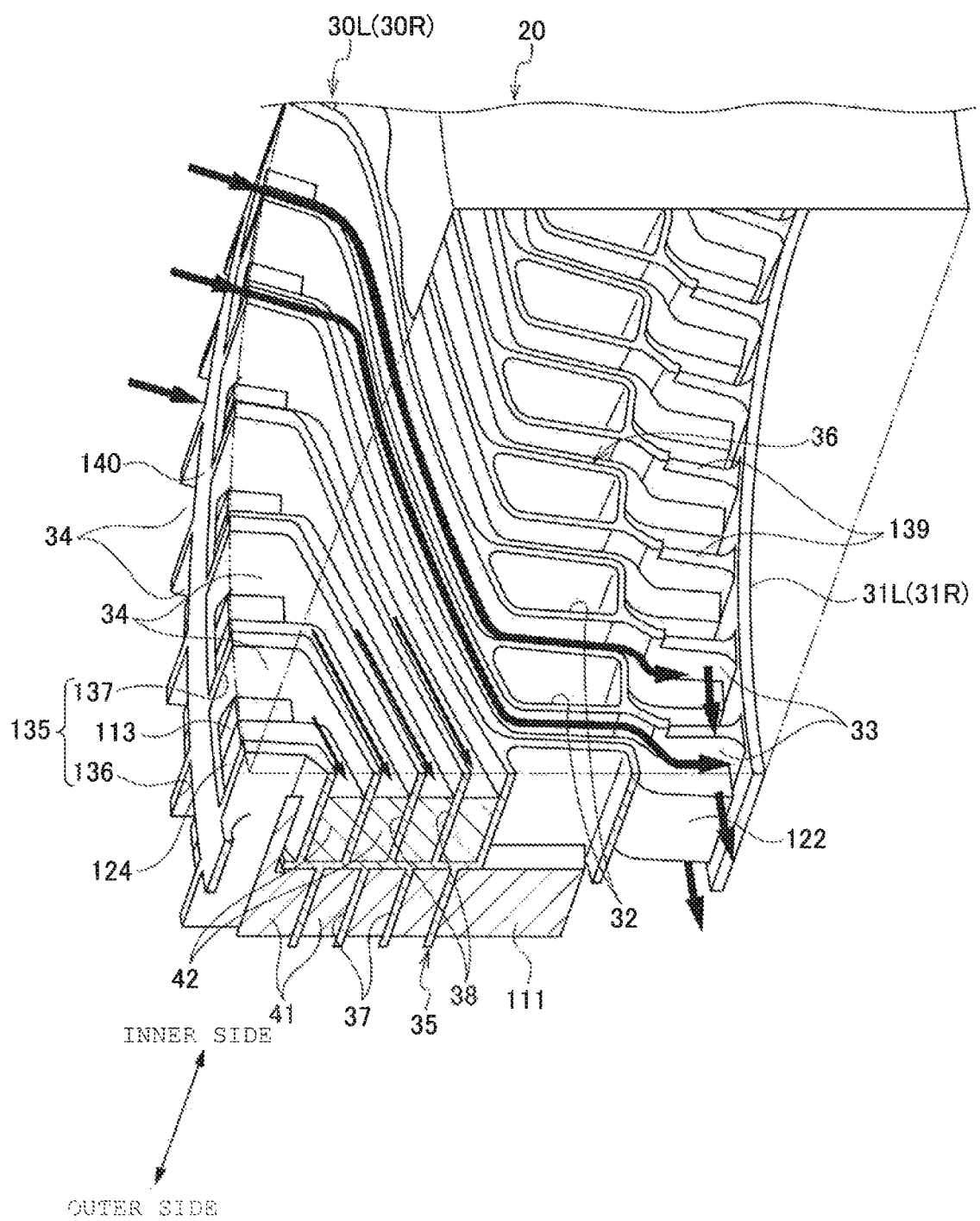
FIG. 15 is a partial enlarged perspective view of a base plate for explaining a flow of refrigerant.

In the base plates 31L, 31R, a radially innermost portion 39 where the radially inner through holes 33 are formed is set at a length (L2) that is equal to an axial width of one connection coil 40, and the other area than the radially innermost portion 39 where the radially outer through holes 32 and the outer circumferential holes 34 are formed is set at an axial width (2×L2+L3) that is substantially equal to a sum of a total axial width (2×L2) of two connection coils 40 and a thickness (L3) of the partition wall 31c. To be specific, as shown in FIGS. 6 and 15, the outer end faces of the base plates 31L, 31R are slightly longer than the axial width of one connection coil 40 and protrude slightly more than the outer end faces of the outer connection coils 41 which are inserted individually into the outer surface grooves 37, 37a, and the inner end faces of the base plates 31L, 31R are slightly longer than the axial width of one connection coil 40 and protrude slightly more than the inner end faces of the inner connection coils 42 which are inserted into the inner surface groove 38. However, in this specification, the slightly different length is not taken into consideration, In the base plate assemblies 30L, 301, as shown in FIG. 7A, each of the outer surface grooves 37 of the base plates 31L, 31R is formed to be curved along the involute curve so as to connect the outer circumferential hole 34 and the radially outer through hole 32 that is spaced a predetermined angle in a counterclockwise direction from the outer circumferential hole 34, when seen from the front. As shown in FIG. 7B, however, in the plural outer surface grooves 37 on the base plate 31L, each of the twelve outer surface grooves 37a that extends towards the deployed portion 31a is formed to be curved along the involute curve so as to connect the outer circumferential hole 34a and the radially outer through hole 32 that is spaced an angle that is slightly greater than the predetermined angle in the counterclockwise direction from the outer circumferential hole 34a. FIGS. 7A, 7B show a state in which the outer connection coils 41 and the inner connection coils 42 described later are accommodated in the outer surface grooves 37 and the inner surface grooves 38, respectively.

Each of the inner surface grooves 38 of the base plates 31L, 31R is formed to be curved while avoiding the radially outer through hole 32 so as to connect the outer circumferential hole 34 and the radially inner through hole 33 that is spaced a predetermined angle in the counterclockwise direction (in a clockwise direction as seen from the side shown in FIG. 7A) from the outer circumferential hole 34, when seen from the front. As shown in FIG. 7B, however, in the plural inner surface grooves 38 on the base plate 31L, each of the twelve inner surface grooves 38a that extends towards the deployed portion 31a of the base plate 31L is formed to be curved along the involute curve so as to connect the outer circumferential hole 34a and the radially inner through hole 33 that is spaced an angle that is slightly greater than the predetermined angle in the counterclockwise direction from the outer circumferential hole 34a. The remaining three inner surface grooves 38a in the fifteen inner surface grooves 38a communicate with the input terminal notched portions 34c.

Namely, as shown in FIGS. 7A, 7B, the radially outer through holes 32 and the radially inner through holes 33 are connected via the outer circumferential holes 34 to which the outer surface grooves 37 and the inner surface grooves 38 continue commonly or the outer circumferential holes 34a to which the outer surface grooves 37a and the inner surface grooves 38a continue commonly.

[2-2 Connection Coils]

The connection coils 40 are formed of a conductive material such as copper into a plate shape and include the outer connection coils 41 (41a, 41b) that are inserted individually into the outer surface grooves 37, 37a and the inner connection coils 42 (42a, 42b) that are inserted individually into the inner surface grooves 38. When referred to herein, the outer connection coils 41 mean the connection coils 40 that come to lie on an axially outer side of the stator 10 and the inner connection coils 42 mean the connection coils 40 that come to lie on an axially inner side of the stator 10 when the stator core assembly 20 and the base plate assemblies 30L, 30R are assembled together.

The outer connection coil 41a is a plate conductor having a uniform thickness and a rectangular cross section. A radially inner end portion 111 is bent radially from an outer connection coil main body 110 that is formed so as to extend along an involute curve having the same shape as that of the outer surface groove 37, and a radially outer end portion 112 is also bent radially from the outer connection coil main body 110. An outer connection coil extending portion 113 is formed at the radially outer end portion 112 of the outer connection coil 41a so as to extend axially inwards. Axial widths (L2) of the outer connection coil main body 110 and the radially inner end portion 111 are equal to a depth of the outer surface groove 37, and an axial width (L4) of the outer connection coil extending portion 113 is set at an axial width (2×L2+L3) that is equal to a sum of the depths of the outer surface groove 37 and the inner surface groove 38 and a thickness (L3) of the partition wall 31c. In addition, the twelve outer connection coils 41b have the same construction as that of the outer connection coil 41a except that an outer connection coil main body 110 is formed so as to be curved into the same shape as that of the outer surface groove 37a.

The inner connection coil 42a is a plate conductor having a uniform thickness and a rectangular cross section. A radially inner end portion 122 is bent radially from an inner connection coil main body 120 that is formed so as to extend along an involute curve having the same shape as that of the inner surface groove 38 by way of a bypass portion 121 that is formed so as to bypass the radially outer through hole 32, and a radially outer end portion 123 is also bent radially from the inner connection coil main body 120. An inner connection coil extending portion 124 is formed at the radially outer end portion 123 of the inner connection coil 42a so as to extend axially outwards. Axial widths (L2) of the inner connection coil main body 120 and the radially inner end portion 122 are equal to a depth of the inner surface groove 38, and an axial width (L4) of the inner connection coil extending portion 124 is set at an axial width (2×L2+L3) that is equal to a sum of the depths of the outer surface groove 37 and the inner surface groove 38 and the thickness of the partition wall 31c. In addition, the fifteen inner connection coils 42b that are inserted into the inner surface grooves 38a basically have the same configuration as that of the inner connection coil 42a except that the inner connection coil main body 120 is formed so as to be curved into the same shape as that of the inner surface groove 38a. However, in the fifteen inner connection coils 42b, the input terminal portions 43 configured for connection to external equipment are formed integrally on the radially outer end portions 123 so as to fit in the input terminal notched portions 34c on the three inner connection coils 42b that are disposed in the positions corresponding to the input terminal notched portions 34c.

The outer connection coil 41 and the inner connection coil 42 have the same thickness, and the thickness of the outer connection coil 41 and the inner connection coil 42 is set at a thickness that is the same as the thickness of the radially outer slot coil 26 and the radially inner slot coil 27 which have the same thickness. The thickness of the outer connection coil 41 and the inner connection coil 42 is smaller than the axial width (L2) of the outer connection coil 41 and the inner connection coil 42 (the outer connection coil main body 110 and the inner connection coil main body 120). The aforesaid "the axial width of x connection coils 40 (x=1, 2, 4)" means the axial width of the outer connection coil main body 110 and the inner connection coil main body 120. "Substantially equal" represents an expression including an error equaling the thickness of the partition wall 31c. The thickness of the insulation sheet 65 is not taken into consideration.

The outer connection coils 41, the inner connection coils 42 and the slot coils 25 can be formed into the desired axial widths and desired planar shapes by pressing and punching a metallic sheet (for example, a copper sheet) having a predetermined thickness. Further, in the outer connection coil 41, by bending the pressed and punched sheet conductor, the outer connection coil main body 110 that is formed to extend along the involute curve having the same shape as that of the outer surface grooves 37, 37a, the radially inner end portion 111 and the radially outer end portion 112 that are connected from the outer connection coil main body 110 while being bent can be formed. Similarly, in the inner connection coil 42, by bending the pressed and punched sheet conductor, the inner connection coil main body 120 that is formed to extend along the involute curve having the same shape as that of the inner surface grooves 38, 38a, the radially inner end portion 122 and the radially outer end portion 123 that are connected from the inner connection coil main body 120 while being bent can be formed.

Figure 14:
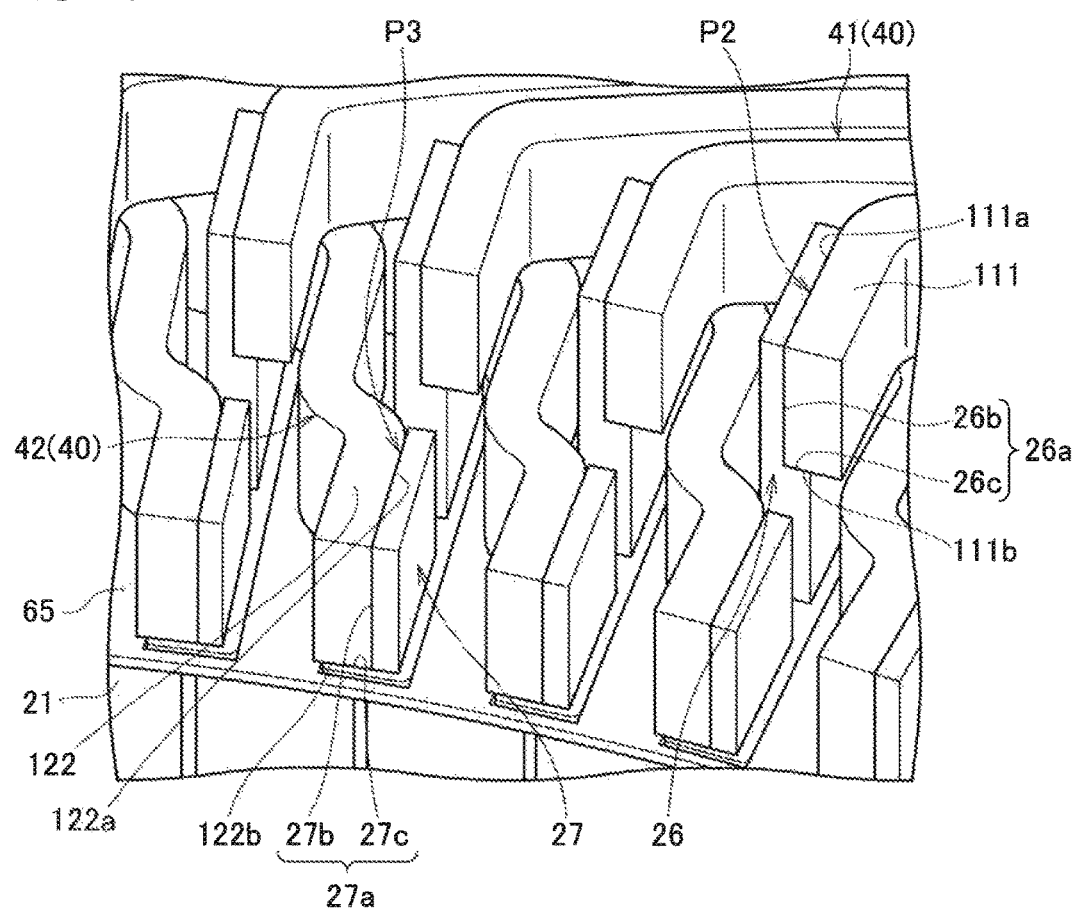
FIG. 14 is a perspective view illustrating the joining of a radially inner end portion of the outer connection coil and a step portion of a radially outer slot coil and the joining of a radially inner end portion of the inner connection coil and a step portion of a radially inner slot coil.

The outer connection coils 41a, 41b are inserted into the outer surface grooves 37, 37a of the base plates 31L, 31R. The radially inner end portions 111 of the outer connection coils 41 are disposed in the radially outer through holes 32 and are brought into abutment with the step portions 26a of the radially outer slot coils 26 that are inserted into the slots 23 in the stator core 21 and that are similarly disposed in the radially outer through holes 32 when assembling the stator core assembly 20 and the base plate assemblies 30L, 30R together, as shown in FIG. 14.

The inner connection coils 42a, 42b are inserted into the inner surface grooves 38, 38a of the base plates 31L, 31R. The radially inner end portions 122 of the inner connection coils 42a, 42b are disposed in the radially inner through holes 33 and are brought into abutment with the step portions 27a of the radially inner slot coils 27 that are inserted into the slots 23 in the stator core 21 and that are similarly disposed in the radially inner through holes 33 when assembling the stator core assembly 20 and the base plate assemblies 30L, 30R together, as shown in FIG. 14.

Figure 13:
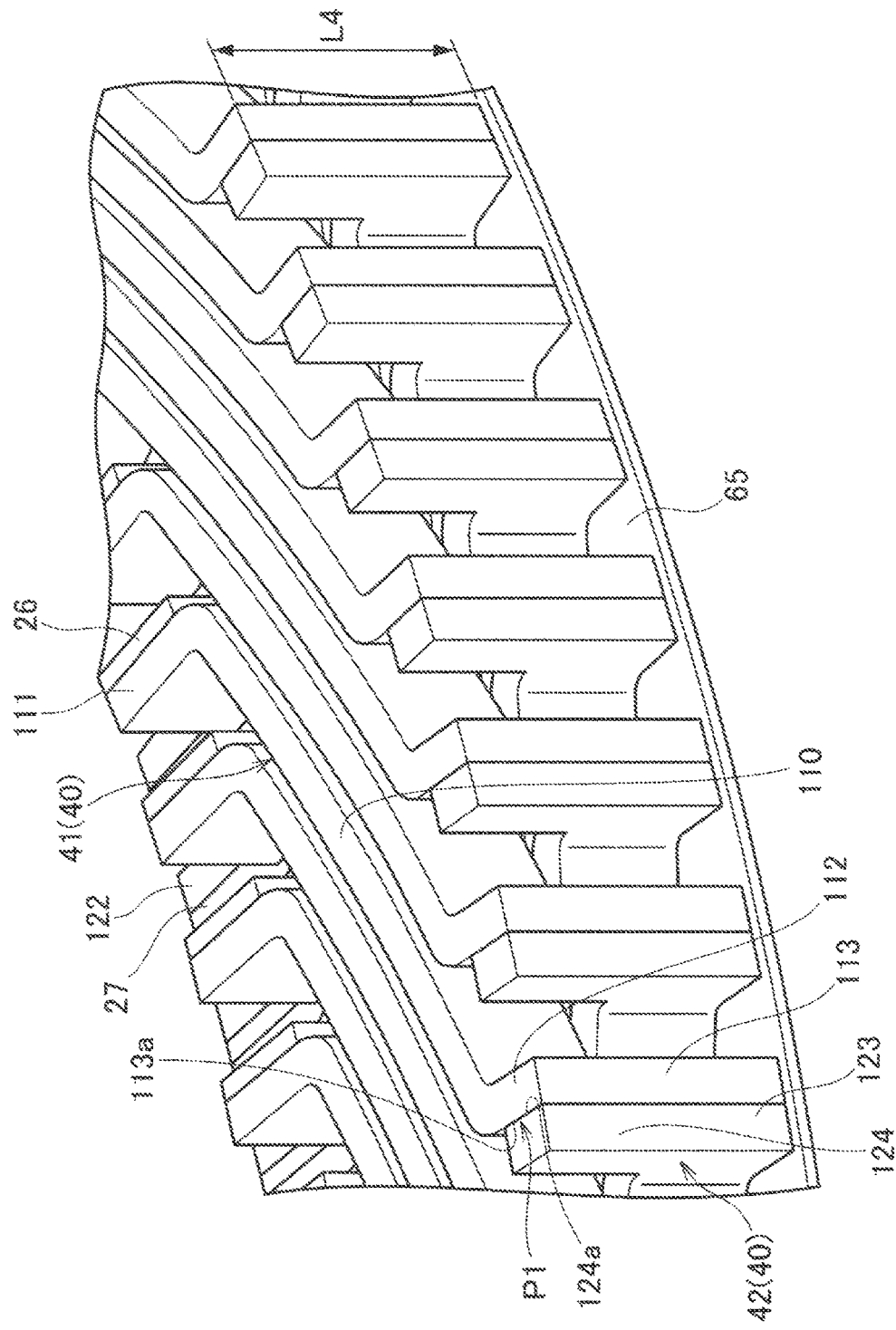
FIG. 13 is a perspective view illustrating the joining of an outer connection coil extending portion and an inner connection coil extending portion.

The radially outer end portions 112 of the outer connection coils 41a, 41b and the radially outer end portions 123 of the inner connection coils 42a, 42b are both disposed in the outer circumferential holes 34, whereby side surfaces 113a of the outer connection coil extending portions 113 that are oriented in the one circumferential direction and side surfaces 124a of the inner coil extending portions 124 that are oriented in the other circumferential direction are brought into abutment with each other over the whole surface in the radial and axial directions, as shown in FIG. 13.

[3 Joining]

The radially inner end portions 111 of the outer connection coils 41 and the step portions 26a of the radially outer slot coils 26 which are brought into abutment with each other, the radially inner end portions 122 of the inner connection coils 42 and the step portions 27a of the radially inner slot coils 27 which are brought into abutment with each other, and the outer connection coil extending portions 113 of the outer connection coils 41 and the inner connection coil extending portions 124 of the inner connection coils 42 which are brought into abutment with each other are joined together on planar plate surfaces thereof that intersect a thickness direction through welding, preferably through laser welding. In the following description, joining will be described as being carried out using laser welding.

As shown in FIG. 13, in the outer connection coil extending portions 113 and the inner connection coil extending portions 124, the side surfaces 113a of the outer connection coil extending portions 113 that are oriented in the one circumferential direction and the side surfaces 124a of the inner connection coil extending portions 124 that are oriented in the other circumferential direction are made to face each other for abutment, both of which are planar plate surfaces that intersect the thickness direction and which follow the axial direction, whereby the plate surfaces are brought into surface contact with each other over the whole surface in the radial and axial directions. With both the side surfaces 113a, 124a brought into surface contact with each other, laser welding is executed along abutment planes P1 that extend in the radial direction from axially outer sides of the outer circumferential holes 34, whereby the side surfaces 113a, 124a are joined together on the abutment planes P1. By adopting this configuration, the radially outer end portions 112 of the outer connection coils 41 and the radially outer end portions 123 of the inner connection coils 42 which are situated in the same outer circumferential holes 34 are electrically connected together, whereby the base plate assemblies 30L, 30R are made up. In FIG. 13, the base plates 311, 31R are omitted. This will also be true in FIG. 14.

As shown in FIG. 14, in assembling together the stator core assembly 20 and the base plate assemblies 30L, 30R, the base plates assemblies 30L, 30R are assembled to the stator core assembly 20 in the axial direction with the insulation sheets 65 interposed therebetween while aligning the base plate assemblies 30L, 30R relatively with the stator core assembly 20 in the circumferential direction, whereby the radially inner end portions 111 of the outer connection coils 41 are brought into abutment with the step portions 26a of the radially outer slot coils 26 and the radially inner end portions 122 of the inner connection coils 42 are brought into abutment with the step portions 27a of the radially inner slot coils 27, whereby the stator core assembly 20 and the base plate assemblies 30L, 30R are positioned.

In the radially inner end portion 111 of the outer connection coil 41 that is brought into abutment with the step portion 26a of the radially outer slot coil 26, a side surface 111a that is a planar plate surface and which is oriented in the other circumferential direction is brought into abutment with the side surface 26b of the step portion 26a over the whole surface, and the bottom surface 111b is brought into abutment with the bottom surface 26c of the step portion 26a over the whole surface.

With both the planar side surfaces 111a, 26b that intersect the thickness direction and which follow the axial direction brought into surface contact with each other, laser welding is executed along abutment planes P2 that extend in the radial direction from axially outer sides of the radially outer through holes 32, whereby the side surfaces 111a, 26b are joined together on the abutment planes P2.

In the radially inner end portion 122 of the inner connection coil 42 that is brought into abutment with the step portion 27a of the radially inner slot coil 27, a side surface 122a that is a planar plate surface and which is oriented in the one circumferential direction is brought into abutment with the side surface 27b of the step portion 27a over the whole surface, and a bottom surface 122b is brought into abutment with the bottom surface 27e of the step portion 27a over the whole surface.

With both the planar side surfaces 122a, 27b that intersect the thickness direction and which follow the axial direction brought into surface contact with each other, laser welding is executed along abutment planes P3 that extend in the radial direction from axially outer sides of the radially inner through holes 33, whereby the side surfaces 122a, 27b are joined together on the abutment planes P3.

Similarly, the step portions 26a of the radially outer slot coils 26 that are disposed in the radially outer through holes 32a where the busbar notched portions are formed and the busbar connecting portions of the busbars 61U, 61V, 61W that are disposed in the busbar notched portions are laser welded together, and the step portions 27a of the radially inner slot coils 27 that are disposed in the radially inner through holes 33a where the middle point busbar notched portions are formed and the middle point busbar connecting portions of the middle point busbars 62 are laser welded together, whereby the busbars 61U, 61V, 61W and the middle point busbars 62 are joined individually to the radially outer slot coils 26 and the radially inner slot coils 27.

The radially outer through holes 32, 32a, the radially inner through holes 33, 33a and the outer circumferential holes 34 exhibit a rectangular shape as seen from the axial direction and have a space greater than the coil members that are disposed in the interiors thereof, that is, gaps are provided between the laser beam shining portions and the base plates 31L, 31R, and therefore, the base plates 31L, 31R can be prevented from being damaged by the laser beam.

By joining the constituent members together in the way described above, the base plate assemblies 30L, 30R are assembled to the stator core assembly 20 in such a state that the radially outer slot coils 26 and the radially inner slot coils 27 which are inserted into the slots 23 of the stator core 21 are electrically connected together via the outer connection coils 41 and the inner connection coils 42. The outer connection coils 41 and the inner connection coils 42 make up bridge portions of the coil 50 which connect the slot coils 25 of the same phase (for example, the U-phase) together.

Figure 10:
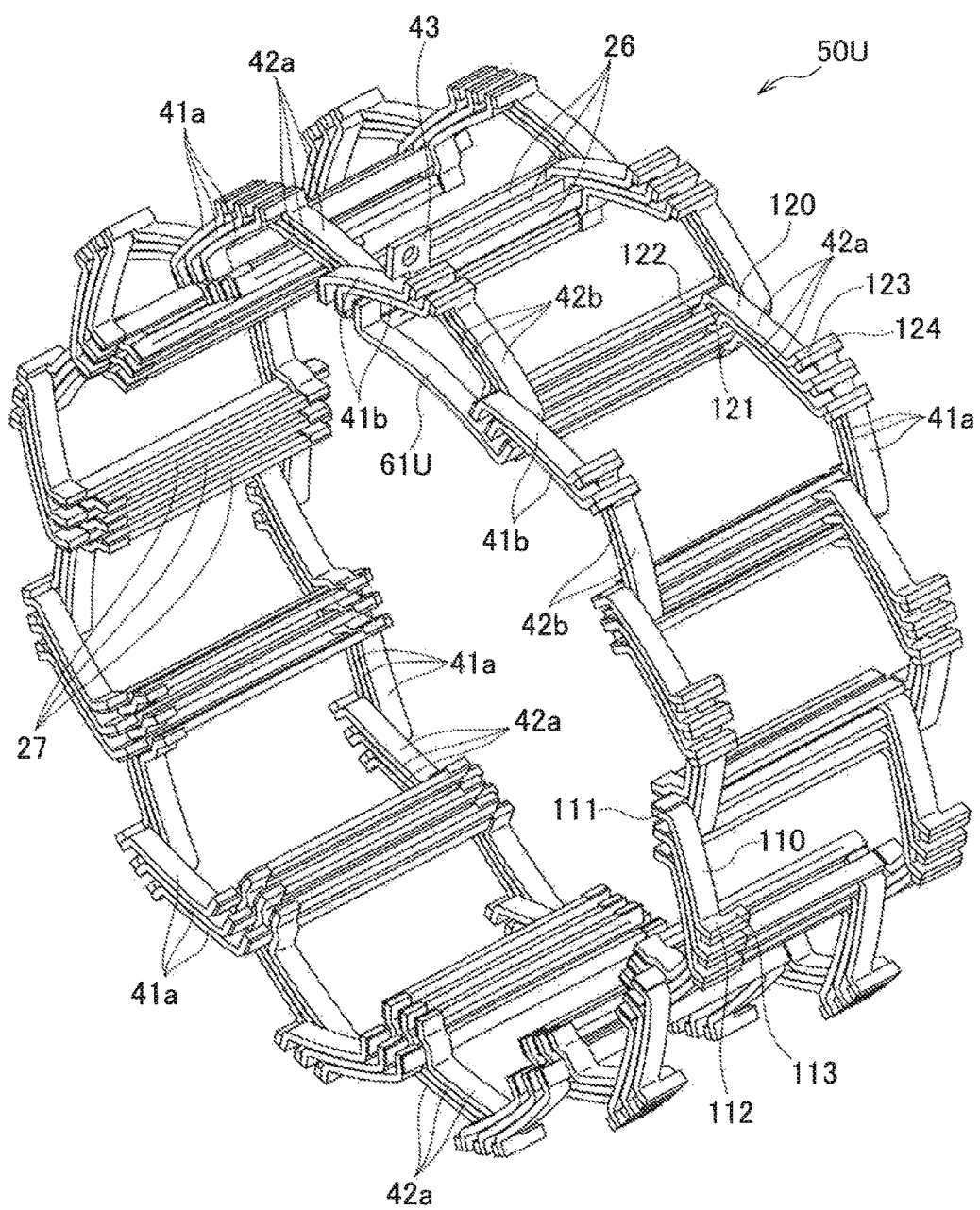
FIG. 10 is a perspective view of a coil of one phase that is taken out of the coils of plurality of phases shown in FIG. 8.

Consequently, for example, as shown in FIG. 10, in relation to the radially outer slot coil 26 and the radially inner slot coil 27 which are disposed in the same slot 23, the outer connection coil 41 that is connected at one end (a near end in the figure) of the radially outer slot coil 26 extends radially outwards and clockwise to be connected to the inner connection coil 42 of the same phase, while the outer connection coil 41 that is connected at the other end (a far end in the figure) of the radially outer slot coil 26 extends radially outwards and counterclockwise to be connected to the inner connection coil 42 of the same phase. In addition, the inner connection coil 42 that is connected at one end (a near end in the figure) of the radially inner slot coil 27 extends radially outwards and counterclockwise to be connected to the outer connection coil 41 of the same phase, while the inner connection coil 42 that is connected to the other end (a far end in the figure) of the radially inner slot coil 27 extends radially outwards and clockwise to be connected to the outer connection coil 41 of the same phase.

Figure 8:
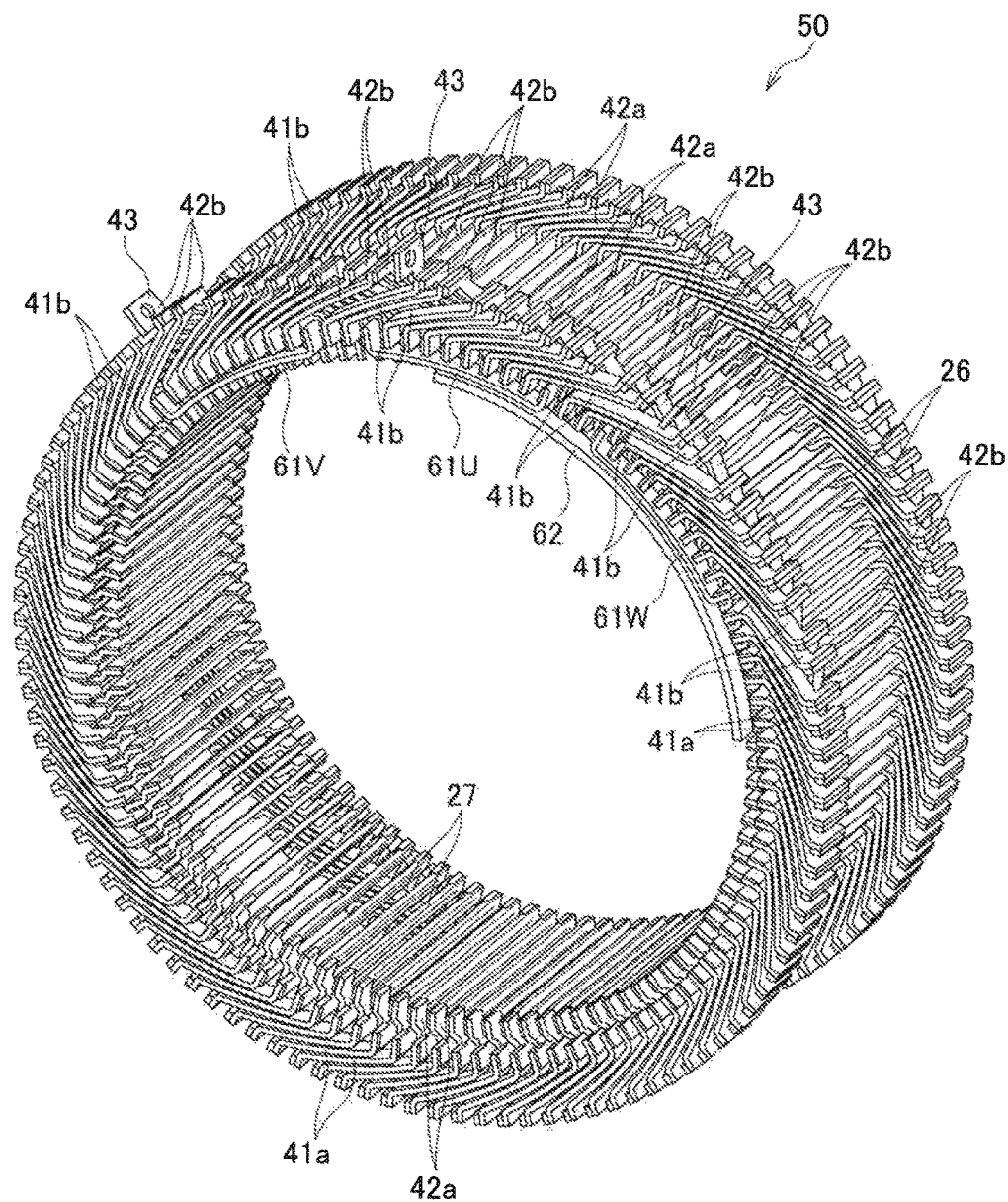
FIG. 8 is a perspective view of coils of different phases.
Figure 9:
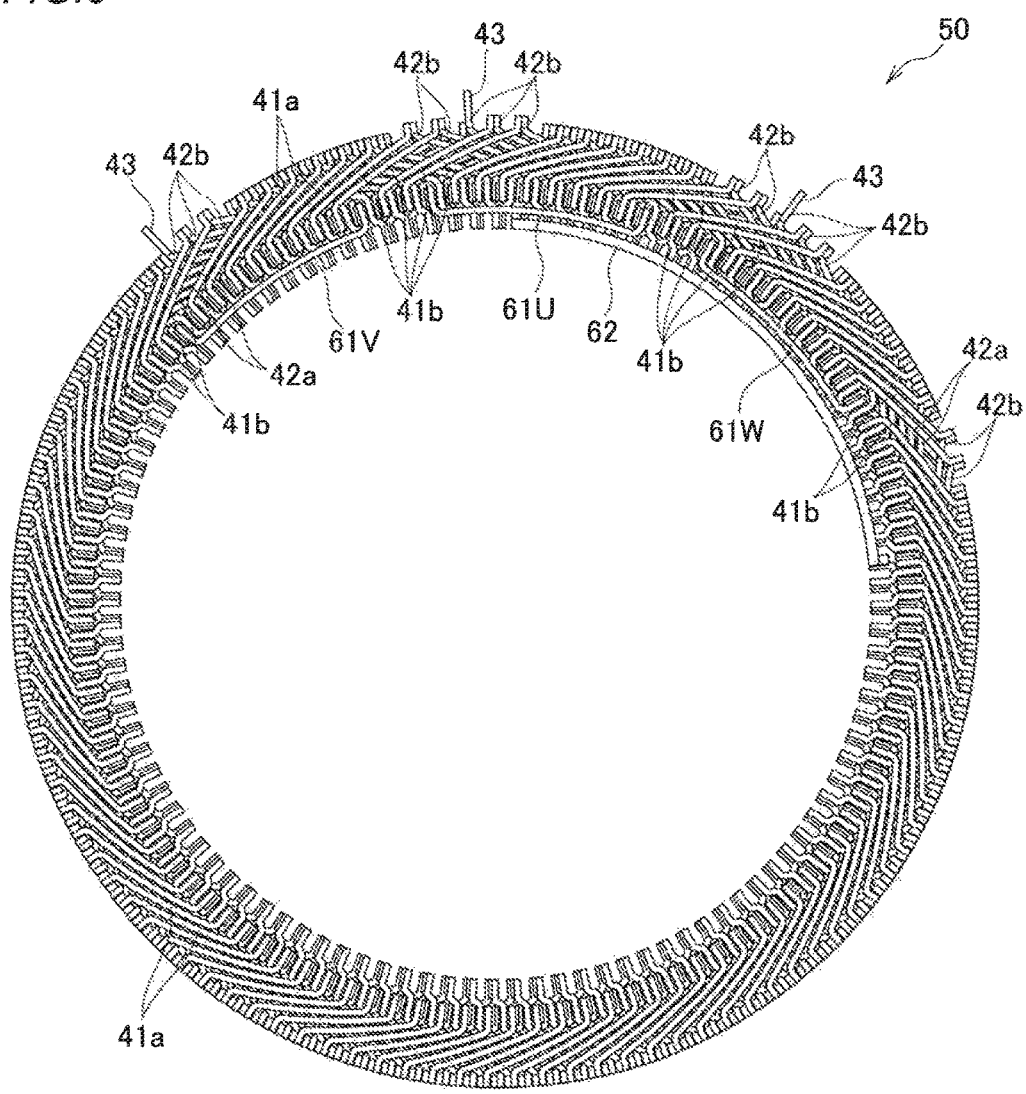
FIG. 9 is a front view of FIG. 8.

In this way, the stator 10 is made up by assembling the pair of base plate assemblies 30L, 30R to both the ends of the stator core assembly 20, whereby the segmented coil 50 forms six coil loops (U-phase coil 50U, V-phase coil 50V, W-phase coil 50W) having the same construction for each phase. In the six coil loops (U-phase coil 50U, V-phase coil 50V, W-phase coil 50W) for each phase, three sets of U-phase coils 50U, three sets of V-phase coils 50V, and three sets of W-phase coils 50W, each set being made up of two coil loops, are wound counterclockwise in this order through wave winding (refer to FIG. 11). FIG. 8 is a perspective view of the coils of the different phases showing the segmented coils of the plurality of phases (U, V, W phases) which are taken out of the stator 10 for the purpose of easy understanding, FIG. 9 is a front view of the FIG. 8, FIG. 10 is a perspective view of the coils of one phase (for example, U-phase) which are further taken out of the coils of the plurality of phases, FIG. 11 is a development view showing a mode of connecting the U-phase coils, and FIG. 12 is a schematic diagram showing a mode of connecting the U-phase, V-phase and W-phase coils together.

A mode of connecting the coils of each phase or U-phase, for example, will be described in greater detail by reference to FIG. 11. In the six coil loops that make up the U-phase coil, three coil loops (U loops) are continuously wound clockwise through wave winding, while three coil loops (U loops) are continuously wound counterclockwise through wave winding, and the U loops and the U loops are connected in series by the busbar 61U. The radially outer slot coil 26 and the radially inner slot coil 27 that are covered with the insulation material 28 and which are disposed in one slot 23 are made up of the coil that make up the U loop and the coil that make up the U loop, and an electric current flows in the same direction.

Figure 11:
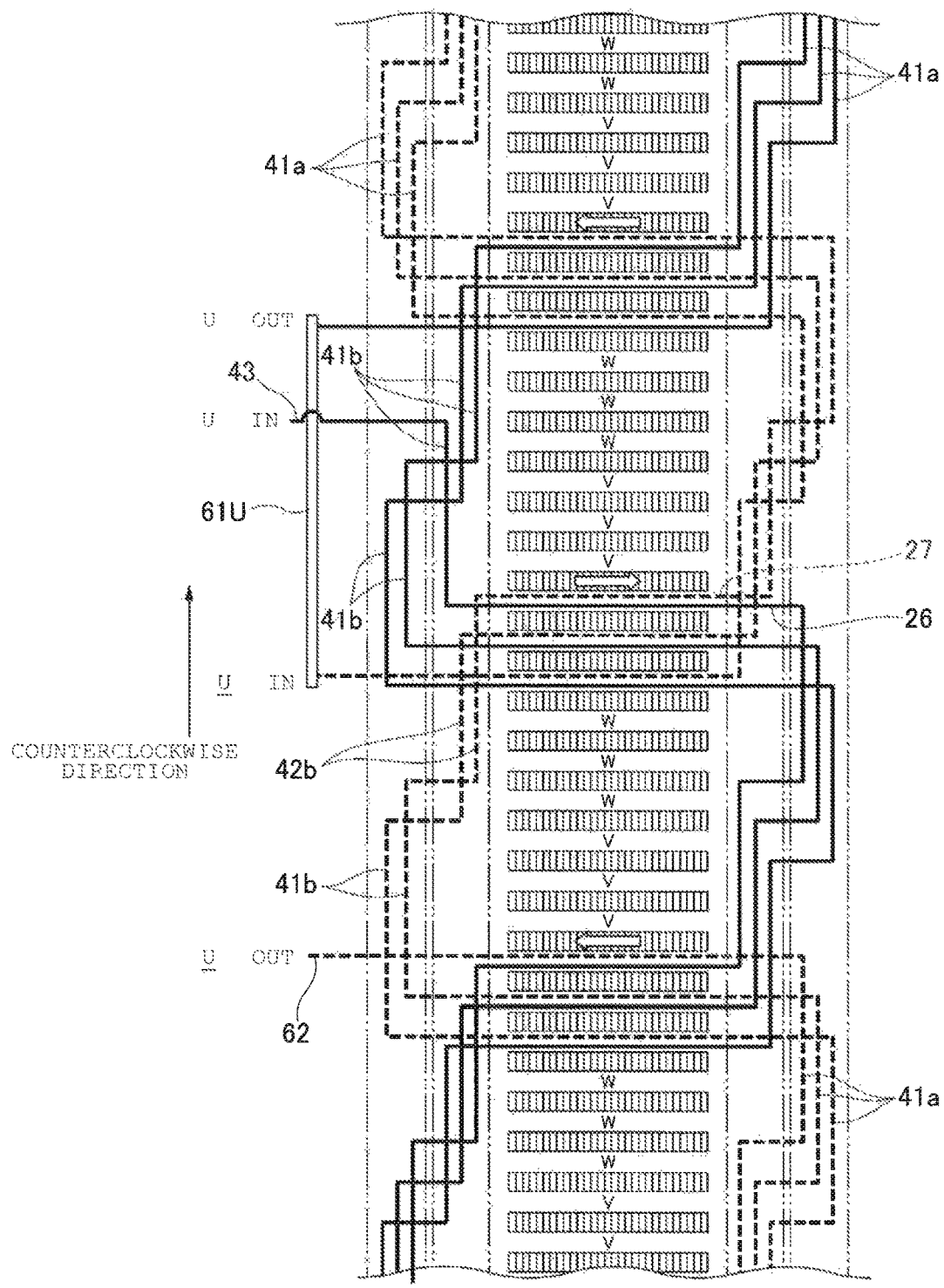
FIG. 11 is a development view showing a mode of connecting U-phase coils.
Figure 12:
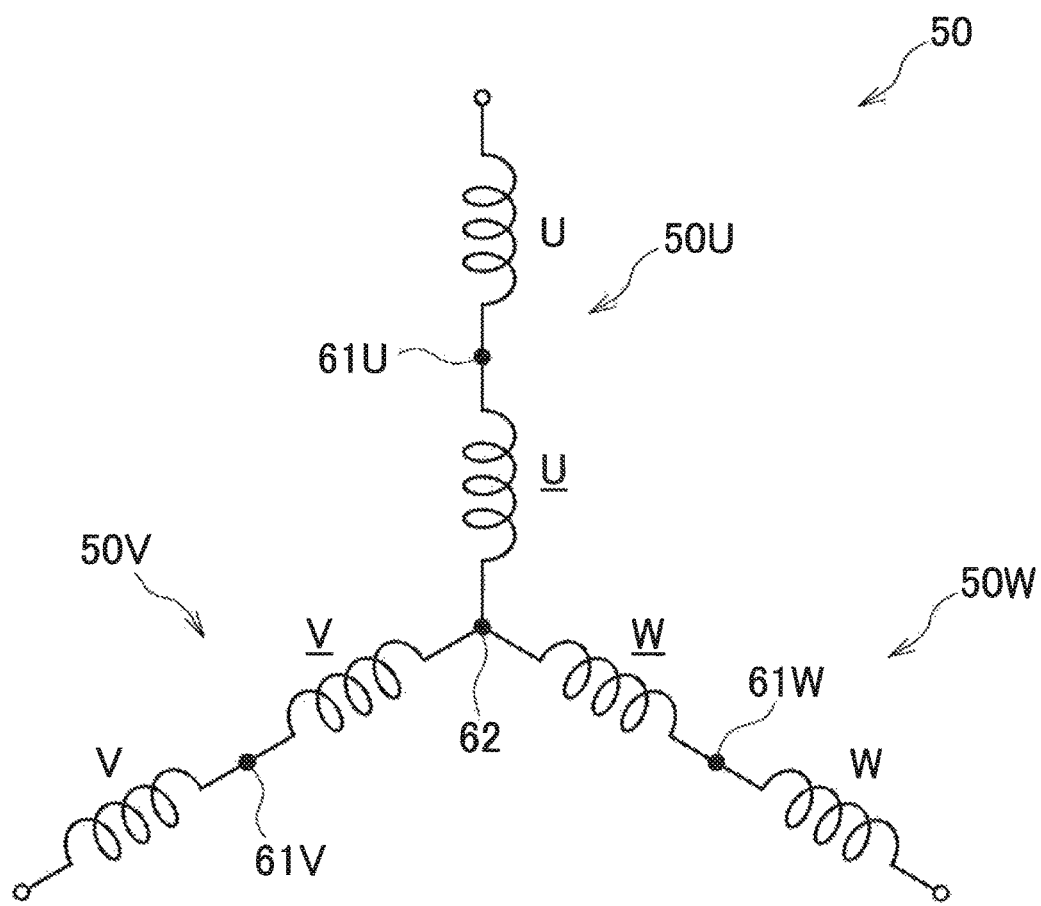
FIG. 12 is a schematic view showing a mode of connecting U-phase, V-phase and W-phase coils.

For example, when paying attention to one of the U loops, as shown in FIG. 11, the coil is connected from an axial end (a right-hand side in the figure) of the radially outer slot coil 26 that is disposed in the U-phase slot 23, and then connected through the outer connection coil 41 and the inner connection coil 42 in this order to the radially inner slot coil 27 in the next U-phase slot 23. Thereafter, the coil is connected from the other axial end (a left-hand side in the figure) of the radially inner slot coil 27, and then connected through the inner connection coil 42 and the outer connection coil 41 in this order to the radially outer slot coil 26 in the following U-phase slot 23. From this on, this connecting configuration is repeated to form the U loop.

Similarly, in six coil loops that make up one of the coils of the remaining another two phases, that is, the V-phase coil (the W-phase coil), too, three V loops (W loops) and three V̲ loops (W̲ loops) that are wound through wave winding in opposite directions are connected in series by the busbar 61V (the busbar 61W), and the radially outer slot coil 26 and the radially inner slot coil 27 that are disposed in one slot 23 are made up of the coils that make up the V loop (V loop) and the coils that make up of the V̲ loop (W̲ loop), and an electric current flows in the same direction. The U-phase coil 50U, the V-phase coil 50V and the W-phase coil 50W are star connected at the middle point busbar 62 as shown in FIG. 12.

In the stator 10, the outer connection coil 41 and the inner connection coil 42 are disposed within an area produced by projecting the stator core 21 in the axial direction and are disposed in different positions in relation to the axial direction. In addition, outer surfaces of the plurality of outer connection coils 41a, 41b that are disposed axially outwards of the stator 10 flush with the end faces of the base plates 31L, 31R.

[4 Cooling Mechanism]

A plurality of cooling pipes 130 (3 in the illustrated embodiment) supported by a housing (not shown) extend in the axial direction above the stator 10, and refrigerant drips onto an outer circumferential surfaces of the respective base plates 31L, 31R from refrigerant supply ports 131 provided above the base plates 31L, 31R.

The refrigerant dripped onto the outer circumferential surfaces of the base plates 31L, 31R flows downward along the outer circumferential surfaces from upper sides of the base plates 31L, 31R. The outer connection coils 41 inserted into the outer surface grooves 37, 37a and the inner connection coil 42 inserted into the inner surface groove 38 of the base plates 31L, 31R are cooled by heat exchange with the refrigerant through the outer circumferential surfaces of the base plates 31L, 31R. However, in the outer connection coil 41 and the inner connection coil 42 positioned at the lower side of the base plates 31L, 31R, the refrigerant is already warmed up due to heat exchange with the outer connection coil 41 and the inner connection coil 42 positioned at the upper side of the base plates 31L, 31R before the refrigerant reaches the lower side of the base plates 31L, 31R, and the refrigerant passes through the outer circumferential surfaces at high speed, so that cooling efficiency is poor and appropriate cooling can hardly be performed in some cases.

Therefore, on the outer circumferential surfaces of the base plates 31L, 31R, the communication portion 135 is provided to communicate with the outer circumferential holes 34. As shown in FIG. 15, the communication portion 135 includes a plurality of outer surface communicating portions 136 and inner surface communicating portions 137 provided along the circumferential direction in predetermined regions of the base plates 31L, 31R, the outer surface communicating portion 136 communicating with the outer circumferential hole 34 on the outer surface groove 37 side, and the inner surface communicating portion 137 communicating with the outer circumferential hole 34 on the inner surface groove 38 side. That is, the outer surface communicating portion 136 and the inner surface communicating portion 137 are positioned at both sides of a refrigerant guide surface 140 formed by extending in the circumferential direction at an axial center of the outer circumferential surface of the base plates 31L, 31R. The refrigerant guide surface 140 is set to have a width suitable for guiding the refrigerant downward along the outer circumferential surface.

Figure 16:
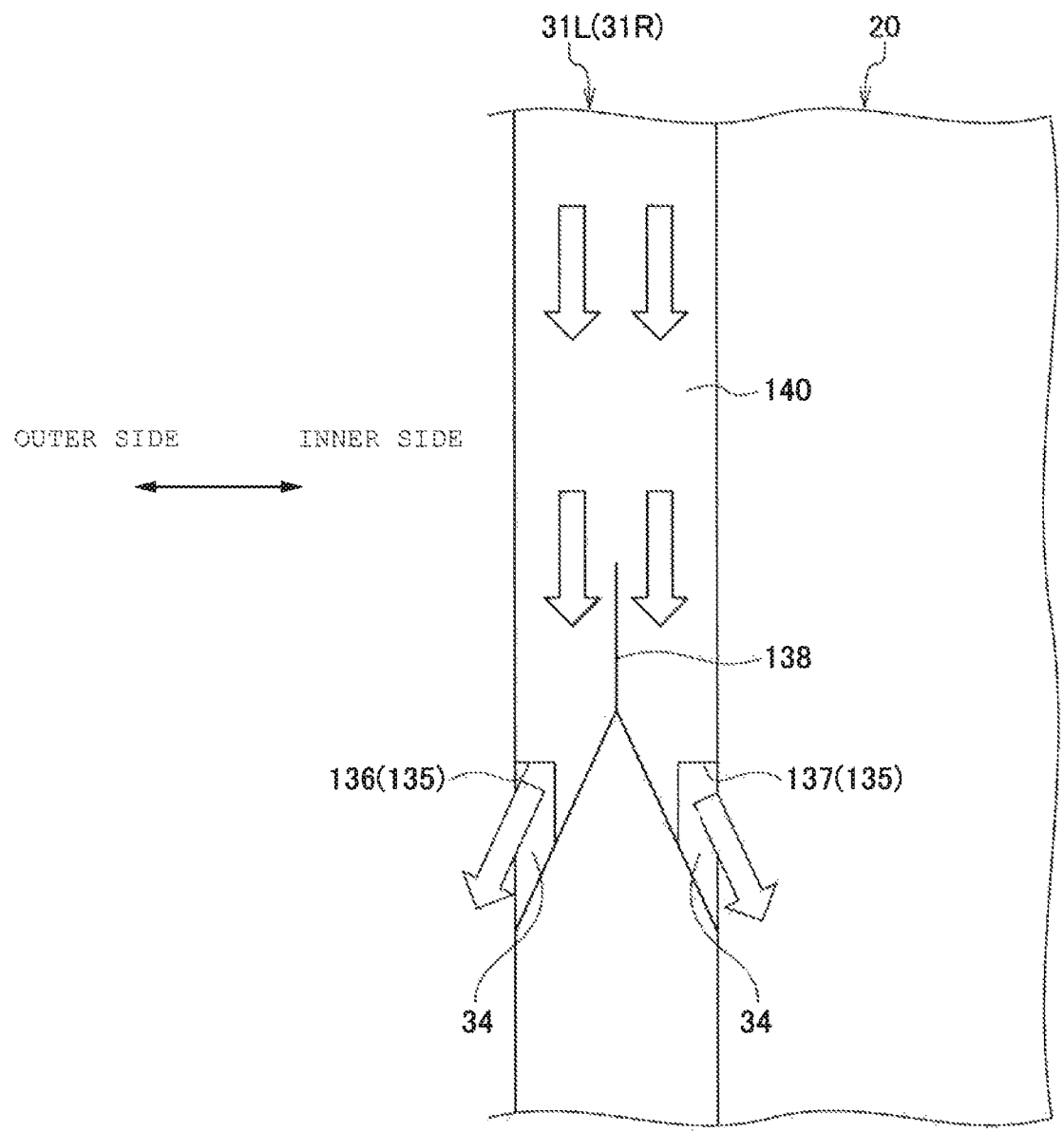
FIG. 16 is a side view of an outer circumferential surface of the base plate assembly shown from outside for explaining a guide portion.

As shown in FIG. 16, a guide portion 138 may be formed on the outer circumferential surface (refrigerant guide surface 140) of the base plates 31L, 31R to guide the refrigerant to the outer surface communicating portion 136 and the inner surface communicating portion 137. The guide portion 138 may be provided integrally with the base plates 31L, 31R so as to protrude to the outer circumferential surface, or may be provided so as to extend to the outer circumferential surface of the base plates 31L, 31R while being fixed to the housing (not shown) separately from the base plates 31L, 31R. The guide portion 138 shown in FIG. 16 has substantially an Y-shape branched toward a downstream side so that the refrigerant can be supplied to both of the outer surface communicating portion 136 and the inner surface communicating portion 137.

The predetermined regions of the base plates 311, 31R where the outer surface communicating portion 136 and the inner surface communicating portion 137 are formed are preferably located in the vicinity of a horizontal line passing through an axial center O of the electric rotary machine or above the horizontal line. Thereby, the refrigerant can be guided to the outer surface communicating portion 136 and the inner surface communicating portion 137 from the outer circumferential surface of the base plates 31L, 31R using gravity, and the refrigerant can be retained in the outer surface groove 37 and the inner surface groove 38 at a region below the horizontal line, that is, a region where the communication portion 135 is not provided. In addition, the communication portion 135 may be provided below the horizontal line as well as at the region in vicinity of the horizontal line passing through the axial center O of the electric rotary machine or above the horizontal line. At the region below the horizontal line where the communication portion 135 is provided, the refrigerant supplied to the outer surface groove 37 and the inner surface groove 38 can be positively discharged.

In this way, the communication portion 135 for communicating the outer surface groove 37 and the inner surface groove 38 is provided on the outer circumferential surface of the base plates 31L, 31R. Thus, the refrigerant dripped onto the outer circumferential surfaces of the base plates 31L, 31R from the refrigerant supply port 131 of the cooling pipe 130 flows downward along the outer circumferential surfaces. One part of the refrigerant flows toward the radially inner side from the radially outer side along the outer surface groove 37 while cooling the outer connection coil 41 through the outer surface communicating portion 136 in the region in which the communication portion 135 is provided, and the other part of the refrigerant flows toward the radially inner side from the radially outer side along the inner surface groove 38 while cooling the inner connection coil 42 through the inner surface communicating portion 137.

As shown in FIG. 15, on the inner surface 36 of the base plate 31L, 31R, a cutout portion 139 is formed in a wall portion partitioning the radially inner through holes 33 adjacent to each other in the circumferential direction. Even on the outer surface 35 of the base plates 31L, 31R, a cutout portion 139 may be formed in a wall portion partitioning the radially outer through holes 32 adjacent to each other in the circumferential direction.

Accordingly, the refrigerant flowing along the outer surface groove 37 and the inner surface groove 38 flows in the circumferential direction or downward through the cutout portion 139. Below the base plates 31L, 31R, one part of the refrigerant flows toward the radially outer side from the radially inner side along the outer surface groove 37 while cooling the outer connection coil 41, and the other part of the refrigerant flows toward the radially outer side from the radially inner side along the inner surface groove 38 while cooling the inner connection coil 42.

As described above, according to the stator 10 for the electric rotary machine of the embodiment, the communication portion 135 for communicating the outer surface groove 37 or the inner surface groove 38 is provided on the outer circumferential surface of the base plates 31L, 31R, so that the refrigerant supplied to the outer circumferential surface is supplied to the outer surface groove 37 or the inner surface groove 38, which accommodates the connection coil 40, through the communication portion 135. In addition, the refrigerant supplied to the outer surface groove 37 or the inner surface groove 38 is guided downward through the front surface sides of the base plates 31L, 31R, so that the refrigerant can reach the connection coil 40 located below. Thus, it is possible to suppress a local temperature rise of the coil 50 and suppress performance deterioration of the electric rotary machine due to the temperature rise.

In addition, the base plates 31L, 31R are respectively formed with the outer surface groove 37 for accommodating the outer connection coil 41 and the inner surface groove 38 for accommodating the inner connection coil 42, and the communicating portion 135 includes the outer surface communicating portion 136 for communicating with the outer surface groove 37 and the inner surface communicating portion 137 for communicating with the inner surface groove 38, so that the refrigerant can be supplied to the both sides of the base plates 31L, 31R, that is, the outer surface 35 side and the inner surface 36 side from the outer circumferential surface, whereby it is possible to uniformly cool the connection coils 40 on both surfaces of the base plates 31L, 31R. In particular, the inner connection coil 42 on the inner surface 36 side facing the stator core 21 is hardly cooled, but it is possible to efficiently cool the inner connection coil 42 by supplying the refrigerant to the inner surface groove 38 through the inner surface communicating portion 137.

Further, since the communication portions 135 are respectively provided in the pair of base plates 31L, 31R located on both ends of the stator core 21, it is possible to uniformly cool the connection coils 40 on both sides of the stator core 21.

The guide portion 138 is provided integrally with the base plates 31L, 31R or separately from the base plates 31L, 31R on the outer circumferential surfaces of the base plates 31L, 31R to guide the refrigerant to the communication portion 135, and thus the refrigerant can be efficiently guided to the communication portion 135 by the guide portion 138.

Further, since the communication portion 135 is provided in the vicinity of the horizontal line passing through the axial center O of the electric rotary machine or above the horizontal line, the refrigerant can be guided to the front surface sides of the base plates 31L, 31R from the outer circumferential surfaces of the base plates 31L, 31R using gravity. In addition, the refrigerant can be retained in the outer surface groove 37 and the inner surface groove 38 at the region below the horizontal line, that is, the region where the communication portion 135 is not provided. On the other hand, at the region below the horizontal line where the communication portion 135 is provided, the refrigerant supplied to the outer surface groove 37 and the inner surface groove 38 can be positively discharged.

The invention is not limited to the embodiment which has been described heretofore and hence can be modified or improved as required.

For example, in the embodiment, while the stator of triple slot type is illustrated in which the coils of the same phase are disposed in every three slots that adjacent to one another in the circumferential direction, the invention is not limited to this configuration. Thus, a stator of single slot type in which coils of different phases are disposed individually and sequentially in slots that are arranged in the circumferential direction or a stator of double slot type in which coils of the same phase are disposed in every two slots that lie adjacent to each other in the circumferential direction may be used.

The form of connecting the coils is not limited to the one described in the embodiment. Thus, arbitrary specifications can be selected, and a direct connection and a parallel connection can also be selected as required.

Further, the slot coil 25 is not limited to the plate conductor having the rectangular section, and may be a cylindrical conductor having a circular section or a columnar conductor having a polygonal section. The coupling between the slot coil 25 and the connection coil 40 includes not only weld-joining but also fastening by caulking, for example. However, in the case where the slot coil is the plate conductor, it is possible to easily manufacture the slot coil in which a slit is formed at a desired position by press working or the like.

In addition, a cover having insulation properties may be disposed on the axially outer sides of the pair of base plate assemblies 30L, 30R, or the pair of base plate assemblies 30L, 30R may be covered with a resin or the like.

Further, the number, shape, forming region, and the like of the outer surface communicating portion 136 and the inner surface communicating portion 137 constituting the communication portion 135 can be appropriately set. For example, the plurality of communication portions 135 may be disposed on the left and right near the horizontal line passing through the axial center O of the electric rotary machine as shown in FIG. 15, and may be disposed continuously or intermittently in the circumferential direction, in addition, as shown in FIG. 16, one communication portion 135 including the outer surface communicating portion 136 and the inner surface communicating portion 137 may be disposed at one or more positions.

Further, the communication portion 135 may be provided with only the inner surface communicating portion 137 communicating with the inner surface groove 38, and the refrigerant may be blown out to the outer surface 35 from the outer surface 35 side.

DESCRIPTION OF REFERENCE NUMERALS AND CHARACTERS 10 stator for electric rotary machine
21 stator core
23 slot
25 slot coil
31L, 31R base plate
35 outer surface
36 inner surface
37 outer surface groove (connection coil accommodating groove)
38 inner surface groove (connection coil accommodating groove)
40 connection coil
41 outer connection coil
42 inner connection coil
50 coil
135 communication portion
136 outer surface communicating portion
137 inner surface communicating portion
138 guide portion
O axial center

The invention claimed is:

1. A stator for an electric rotary machine comprising:
a stator core which has plural slots; and
segmented coils of a plurality of phases, wherein:
the stator core is provided with a base plate at least one side thereof in an axial direction;
the segmented coils of the plurality of phases include plural slot coils which are individually disposed in the plural slots of the stator core and which extend substantially linearly, and plural connection coils which are individually disposed in the base plate and which make up bridge portions by connecting the slot coils of a same phase together;
the connection coil is accommodated in a connection coil accommodating groove formed on a front surface of the base plate;
the base plate is provided with a communication portion on an outer circumferential surface thereof for communicating with the connection coil accommodating groove; and
the base plate is provided with a guide portion on the outer circumferential surface thereof integrally with the base plate or separately from the base plate to guide refrigerant to the communication portion.

2. The stator for an electric rotary machine according to claim 1, wherein:
the connection coil includes an inner connection coil and an outer connection coil which are disposed in different positions in the axial direction;
the base plate is formed with the connection coil accommodating grooves on an outer surface and an inner surface thereof, respectively;
the outer connection coil is disposed in an outer surface groove formed on the outer surface;
the inner connection coil is disposed in an inner surface groove formed on the inner surface; and
the communication portion includes an outer surface communicating portion and an inner surface communicating portion, the outer surface communicating portion communicating with the outer surface groove and the inner surface communicating portion communicating with the inner surface groove.

3. The stator for an electric rotary machine according to claim 1, wherein:
the base plate is provided in pairs on both ends of the stator core in the axial direction; and
the pair of base plates are provided with the communication portions, respectively.

4. The stator for an electric rotary machine according to claim 1, wherein
the communication portion is provided in a vicinity of a horizontal line passing through an axial center of the electric rotary machine or above the horizontal line.

* * * * *